United States Patent Office 3,518,632
Patented June 30, 1970

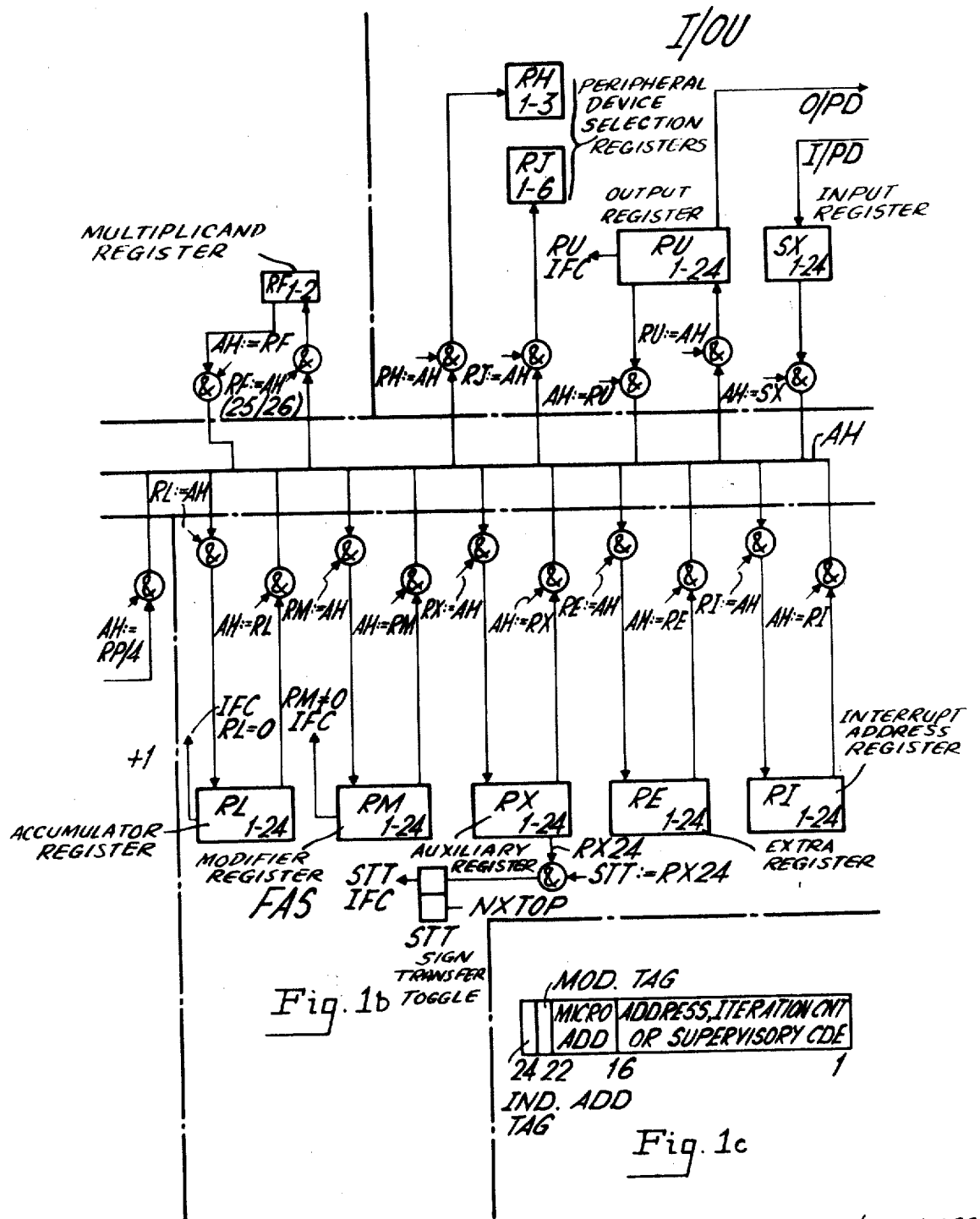

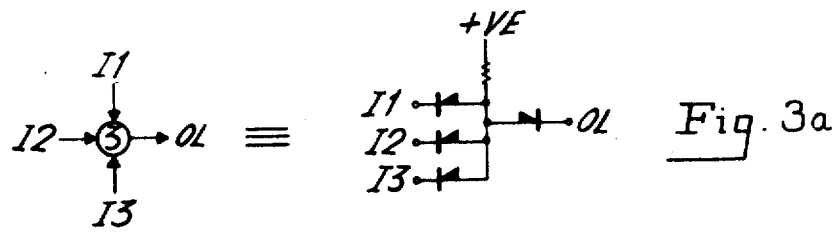
Fig. 3a
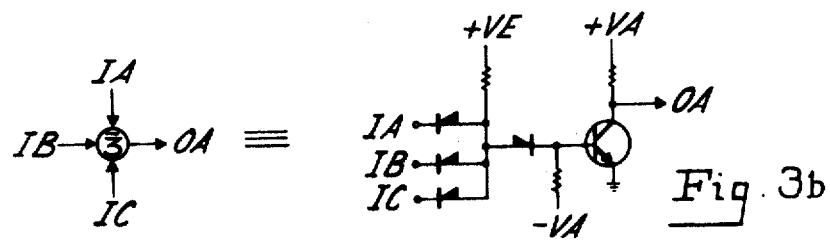
Fig. 3b
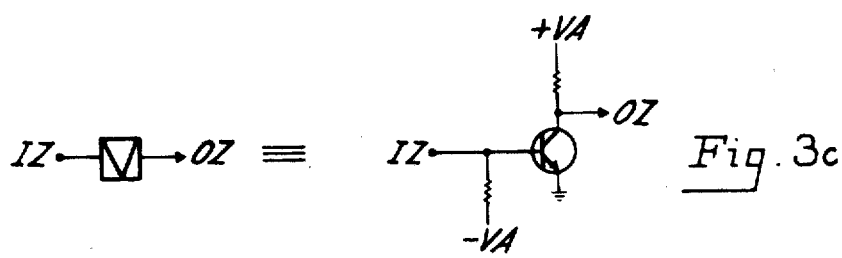
Fig. 3c
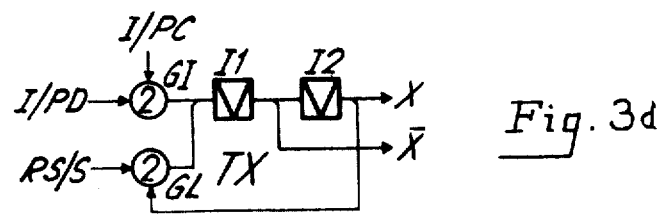
Fig. 3d
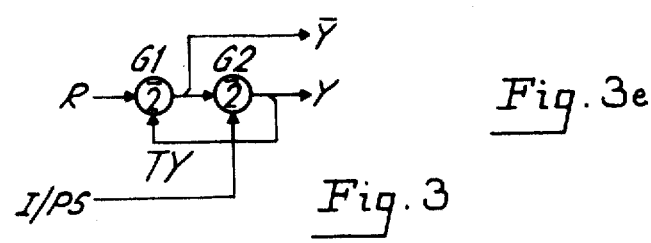
Fig. 3e
Fig. 3

3,518,632
DATA PROCESSING SYSTEM UTILIZING STORED INSTRUCTION PROGRAM
Ronald Threadgold and Orran Terence Pate, Liverpool, England, assignors to Automatic Telephone & Electric Company Limited, Liverpool, England, a British company
Filed May 25, 1967, Ser. No. 641,204
Claims priority, application Great Britain, June 2, 1966, 24,595/66
Int. Cl. G06f 9/16
U.S. Cl. 340—172.5       3 Claims

ABSTRACT OF THE DISCLOSURE

A micro-programme controlled data processing device comprises a main store, a control unit and a plurality of functional units, the main store and the various units being interconnected by a data highway, to which access is obtained by controlling gate circuits in the outputs and inputs of registers associated with the main store and the various units. The gate circuits are controlled by micro-bits obtained from a micro-programme store within the control unit and derived by the micro-programme store from a function code portion of an instruction word read out of the main store, the instruction word also including a portion which normally defines the main store location from which data is to be withdrawn or into which data is to be placed but it can also define other locations. The instruction word also includes an indirect address tag and an address modification tag. The micro-bits obtained from the micro-programme store are gated with clock-controlled timing pulses so that they are active on the main store and other units at specific times within an 8-slot instruction cycle, one slot period being equal to one-quarter of the cycle time of the main store so that two access operations may be performed on the main store in each cycle. One access operation may be used to extract the next programme instruction word and the other to extract the working data defined by the address section of the instruction word. Certain operations require more than one instruction cycle for their completion and one of the micro-bits obtained from the micro-programme store is effective on control logic to provide another series of micro-bits for the next instruction cycle. Iterative operations are similarly controlled.

---

The present invention relates to data processing devices and is more particularly concerned with stored programme systems.

Stored programmed systems are arranged to perform various individual functions or instructions using internally stored instruction words. A sequence of instruction words is combined by a programme, so that the system can carry out the processing of complex functions. Each instruction word usually defines a specific operation to be performed and includes one or more data addresses specifying the data upon which the particular function is to be performed.

The execution of an instruction is performed using one or more basic machine steps with the number of steps varying with the complexity of the function required. For example an add instruction requires relatively few basic steps while a multiply instruction may require relatively many. The execution of the instructions is a function of the control unit of the data processing device which comprises storage elements, such as toggles, and gating elements through which the control signals are routed.

The control signals generated by the control unit serve to control the routing and processing of data between and by the various functional units of the device and the control unit can be considered as the "cornerstone" of the data processing system. Much design effort is required in the construction of a control unit and in many cases a significant number of the total components required to construct a data processing system are used in the control unit. It is, therefore, one of the objects of the present invention to provide a control unit which is relatively simple and cheap to manufacture without diminishing its capabilities.

It is a further object of the invention to organize the control arrangements of a data processing device so that the minimum time is consumed in the control function allowing increased time for the processing of data.

According to the feature of the invention, in a micro-programme controlled data processing device having arrangements for decoding the function code portion of an instruction word to define micro-addresses in a micro-programme store, the instructions so defined falling into two discrete categories the first of which do not require iterative operations and the second of which require iterative operations, said categories being further subdivided as regards said first category into single and double instruction cycle types and as regards said second category into complex iterative instructions (requiring two instruction cycles followed by a set of iterative instruction cycles and a final instruction cycle) and simple iterative instructions (requiring one instruction cycle followed by a set of iterative instruction cycles and a final instruction cycle), the micro-programme store is provided with (a) a first section, which stores control information for the control of single instruction cycles for (i) all the instructions which are of said second category, (ii) all the instructions of said double instruction cycle type and some of said single instruction cycle type of said first category, (b) a second section for storing control information for the control of single instruction cycles for the remainder of said first category and for the second instruction cycle for said complex iterative instructions and (c) a third section which stores control information for automatic instructions and control information for the iterative instruction cycles and the final instruction cycles of instructions in said second category together with the control information for the second instruction cycle of said double instruction cycle instructions of said first category.

According to another feature of the invention, in a micro-programme controlled data processing device having a control unit, a main store and a plurality of functional units for performing logical and arithmetic operations and including arrangements for decoding the function code portion of an instruction word read out of said main store, said function code defining a location (micro-address) in a micro-programme store within said control unit at which is stored a set of micro-instructions which are effective in said control unit to condition said functional units to perform the cycle of the required instruction (as defined by the function code) said instruction word also including an address section for the indication of a main store location at which is stored data for use in the instruction, timing arrangements are provided for timing the instruction cycles and the main store cycles in such a manner that two passes are made to the main store during each instruction cycle, one pass being for the retrieval of the working data required in the performance of the required instruction and the other for the retrieval of the next instruction word in the programme.

According to a further feature of the invention, in a data processing device having a plurality of registers interconnected by a common data highway and provided with facilities for (a) erasing data from one or a pair of registers (b) transferring data to a first of said three registers from either a second or third register with or without erasure of the data in the donor register or (c) transferring data to either or both of said second and third registers from said first register with or without erasure of the data in the donor or unused register, an additional register also connected to said highway is provided for use as an intermediate storage device and control arrangements are effective in a four-slot control cycle in such a manner that (1) in the first slot said first register is capable of being connected to transmit data to said highway and said additional register is capable of being connected to receive data from said highway (2) in the second slot said second register is capable of being connected to transmit data to said highway and said first register is capable of being connected to receive data from said highway (3) in the third slot said additional register is capable of being connected to transmit data to said highway and said second and third registers are capable of being connected to receive data from said highway and (4) in the fourth slot said third register is capable of being connected to transmit data to said highway and said first register is capable of being connected to receive data from the said highway, connecting means conditioned by a discrete code being provided for connecting to the highway the registers appropriate to the operation defined by said discrete code.

According to yet another feature of the invention, in a data processing device consisting of a plurality of units each including at least one register, the input and output paths of the registers in all the units being capable of connection to a common highway, individual operations are each effected within a multi-slot cycle and arrangements are provided for connecting in any one slot of said cycle (a) any one or two of said register to said highway for the transmission of data to said highway and for connecting in said one slot (b) one or a plurality of the remaining registers to said highway for the reception of data present on the highway, the connections being phased so that the transmission of data to said highway occurs before the reception of data present on the highway.

The invention together with its various objects will be more readily understood from the following description which should be read in conjunction with the accompanying drawings.

Of the drawings:

FIGS. 1a and b show a block diagram of a data processing device according to the invention, FIG. 1c shows the instruction word format of the device of FIGS. 1a and b, FIG. 2 shows a detailed block diagram of the control unit of the data processing device, FIGS. 3a–3c show circuit diagrams of the logic elements used in FIGS. 4 and 6.

FIG. 5 shows waveforms relevant to FIG. 4, while

(1) GENERAL DESCRIPTION

Figure 1A:
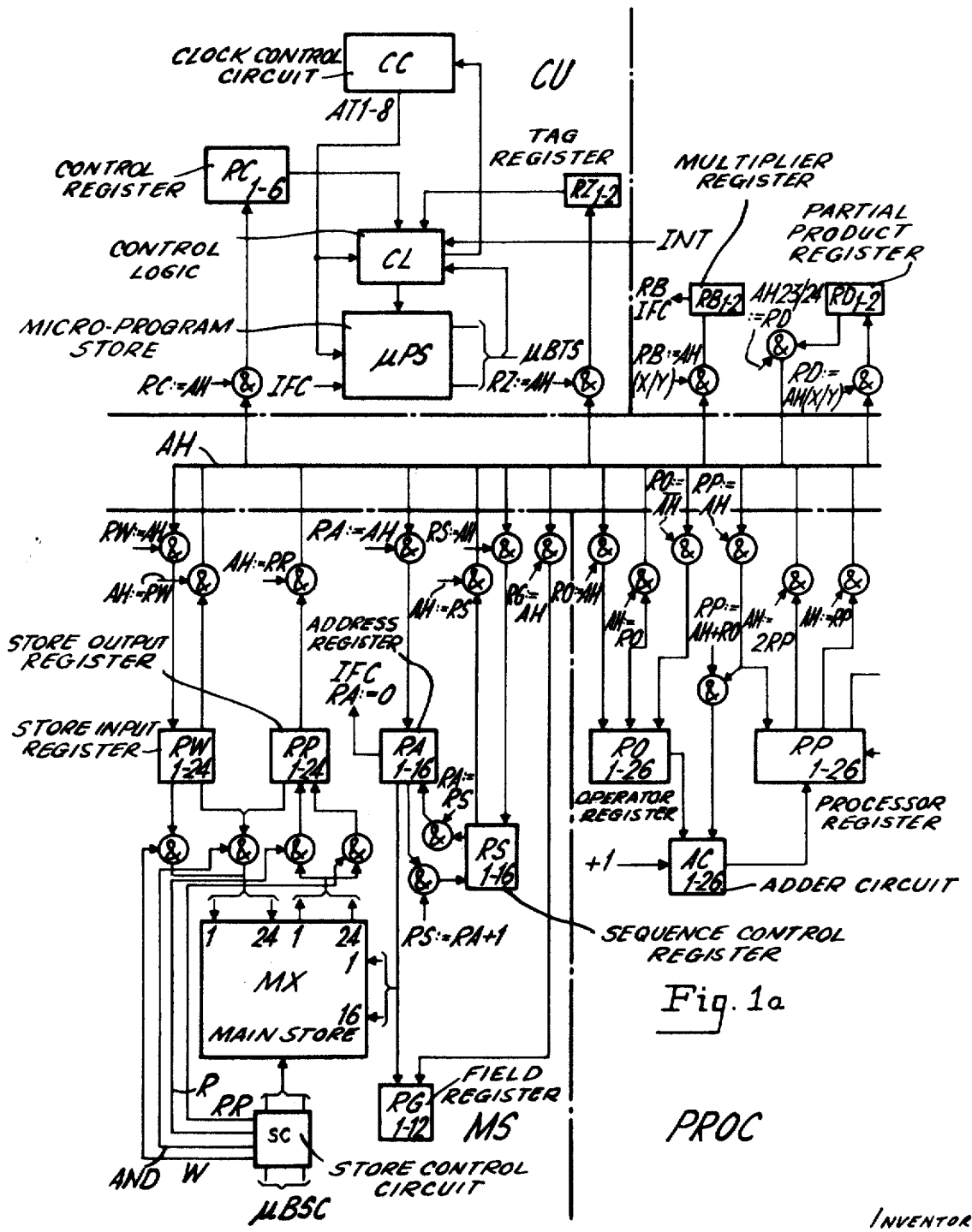

Referring firstly to FIGS. 1a and 1b a general description of one embodiment of a data processing device according to the invention will be given. The device is synchronously controlled and is divided into five main functional sections and all five sections are interconnected by a twenty-eight bit parallel highway AH. The highway consists of twenty-eight parallel paths AH1–26 and AHX and AHY. The output connections from each register served by the highway is by way of amplifiers allowing O-ring functions between registers to be simply performed by connecting two registers to the highway at the same time. The five sections are briefly described below.

(a) *The control unit CU.*—This section exercises control over the rest of the sections by means of the microbits (micro instructions) $\mu$BTS generated by the microprogramme store $\mu$PS. The code assigned to each instruction also corresponds to a discrete address in the micro-programme store. Stored at each location are a number of "1" state signals which are used to generate the micro-bits used to control the functional units of the data processing device in the execution of the function defined by the instruction. Each micro-bit can be considered as falling within one of five sections, (i) register control micro-bits, (ii) store control micro-bits, (iii) arithmetic control micro-bits, (iv) peripheral control micro-bits and (v) cycle control micro-bits. The micro-bits required for most instructions are produced simultaneously by the micro-programme store $\mu$PS when addressed with a micro-address. However, the micro-bits are gated with timing pulses produced by the clock control circuit CC so that they are active on the equipments they control only at specific times within an instruction cycle. The extension of certain micro-bits is also made dependent upon "if conditions," indicated by the leads labelled IFC in FIGS. 1a and 1b produced by the various functional units. The "if condition" arrangements will be discussed more fully later.

As mentioned previously the data processing device is synchronously controlled by the computer clock circuit CC. This circuit is arranged to generate serially eight timing pulses within an equal number of slots for each instruction cycle, the pulses being referred to as pulses AT1 to 8, and these pulses control the time within each instruction cycle at which the micro-bits (micro-instructions) become active. Each slot period is arranged to be of a duration equal to one quarter of the cycle time of the main data and programme store MX. This allows a maximum of two access operations to be performed on the main store for each instruction. Typically one access operation may be used to extract a programme instruction word and the other access operation may be used to extract the working data defined by the address section of the instruction word. The actual organization of the timing cycle and the store working will be considered later. The control unit also includes a six-bit control register RC which is used to hold the instruction code for each instruction and a two-bit register RZ which is used to hold the indirect address and modification tags specified by the instruction word. Both these registers RC and RZ exercise control on the control logic CL which is used to address the micro-programme store $\mu$PS and to organize the control of the data processing device clock circuit CC under certain conditions.

(b) *The main storage unit MS.*—This section includes five registers RW, RR, RA, RS and RG together with the main store matrix MX and its associated control circuit SC. The main store matrix MX may conveniently be of the coincident current magnetic core type and it is arranged to store twenty-four bit data and programme instruction words. All the registers included in the main storage unit MS exercise control on, or handle data associated with, the main store matrix MX. Register RW is used to temporarily store data which is to be written into the store matrix MX and this register is of twenty-four bits capacity. Register RR, also of twenty-four bits capacity, is used to temporarily store data read from the matrix MX and is also used in a store "re-write" operation. Register RA, of sixteen bits capacity, is used to store the address data used in an access operation on the store. Register RS, of sixteen bits capacity, is used to store the programme instruction addresses prior to the use of the address register. Register RG, of twelve bits capacity, is split into two sections each section storing the six most significant bits of the first and last addresses of the store field allocated to a particular programme. All the equipment in the main storage unit MS will be discussed more fully later.

(c) *The processor unit PROC.*—This section includes two register RO and RP and a parallel adder circuit AC. Register RO, of twenty-six bits capacity, is used to store data words used as operators in processing operations. Register RP, also of twenty-six bit capacity, is used to store the result of any arithmetic process and is capable of performing shifts and "add one" functions. Register RP is also capable of gating-out data words shifted up by one or down by two places. The adder circuit AC is a conventional parallel adder and is used to add the contents of the operator register to the data presented over the highway AH. The result of an addition process is passed to the processor register RP.

(d) *The fast access store FAS.*—This section of the device simply consists of five twenty-four bit registers RL (accumulator register), RM (modifier register), RX (auxiliary register), Re (extra register) and RI (the interrupt address register). Each register is accessed from and has access to the highway AH. The significances and uses of these registers will be discussed later.

(e) *The input output unit I/OU.*—This unit consists of four registers, two of which, each having twenty-four bit capacities, are used for passing data from the highway, register RU, to a selected peripheral device and passing data to the highway, register SX, from a peripheral device. The selection of a peripheral device is performed by the contents of register RH and RJ. All the input output unit registers will be discussed more fully later.

(2) OUTLINE OF COMPUTER OPERATION

The computer is organized according to a twenty-four bit one address instruction word format and the significances of the various bits are shown in FIG. 1c. From FIG. 1c it can be seen that bits 1–16 define normally the main store location from which data is wanted or into which data is to be placed. In certain conditional jump instructions, bits 1–16 are used to store the address in the programme to which a programme jump is to be made. In "shift," "arithmetic" and some input/output instructions the data written in bits 1–16 of the instruction word is used as an iteration count. In the "register interchange," instruction, bits 1–16 are used as a supervisory code to define the register to be used in the instruction.

Bits 17–22 define the M-address (micro-address) or operation code for each instruction. This code is used to address the micro-programme store and, therefore, select the required micro-bits from the micro-programme store μPS.

Bit 23 denotes the "address modification tag" which, when marked with a "1," causes the contents of the modifier register RM to be added to the data address defined by bits 1–16 of the instruction word before the store address is used in the main store MS.

Bit 24 denotes the "indirect address tag" which, when marked with a "1," causes the store address in bits 1–16 of the instruction word to be replaced with the data stored at that address. Arrangements can be provided for chaining this facility by setting the "indirect address tag" in the defined indirect address location.

The next instruction word is read from the main store matrix MX towards the end of the current instruction operations. Each instruction ends, in slot 8, by generating a signal NXTOP which is active in the control logic CL. This signal indicates "select next main order" and causes micro-bit signals to be generated which (a) control the passing of the contents of the output register RR in the main store unit MS on to the highway AH (micro-bit signal AH:=RR), (b) control the reading of the micro-address into the control register RC from the highway AH (micro-bit signal RC:=AH), (c) control the reading in of the tags into the tag register RZ from the highway (micro-bit signal RZ:=AH), (d) control the reading in of the address bits 1–16 of the instruction word from the highway AH to the operator register RO in the arithmetic processing unit PROC (micro-bit signal RO:=AH) and (e) cause the data read from the store matrix to be rewritten (micro-bit signal RR).

The micro-bit signals referred to above, control gates which open paths of access between the various equipments required. The nomenclature given to the register/ highway micro-bit control signals indicates the data flow direction. For example, micro-bit signal AH:=RR indicates that the contents of register RR are passed on to the highway hence the "term":=(pronounced becomes) signifies a transfer from right to left of the micro-bit signal name.

It will be realised from the above description of the effects of a select next main order that the computer does not have an instruction word register as such as far as the address section of the instruction word is concerned.

Figure 2:
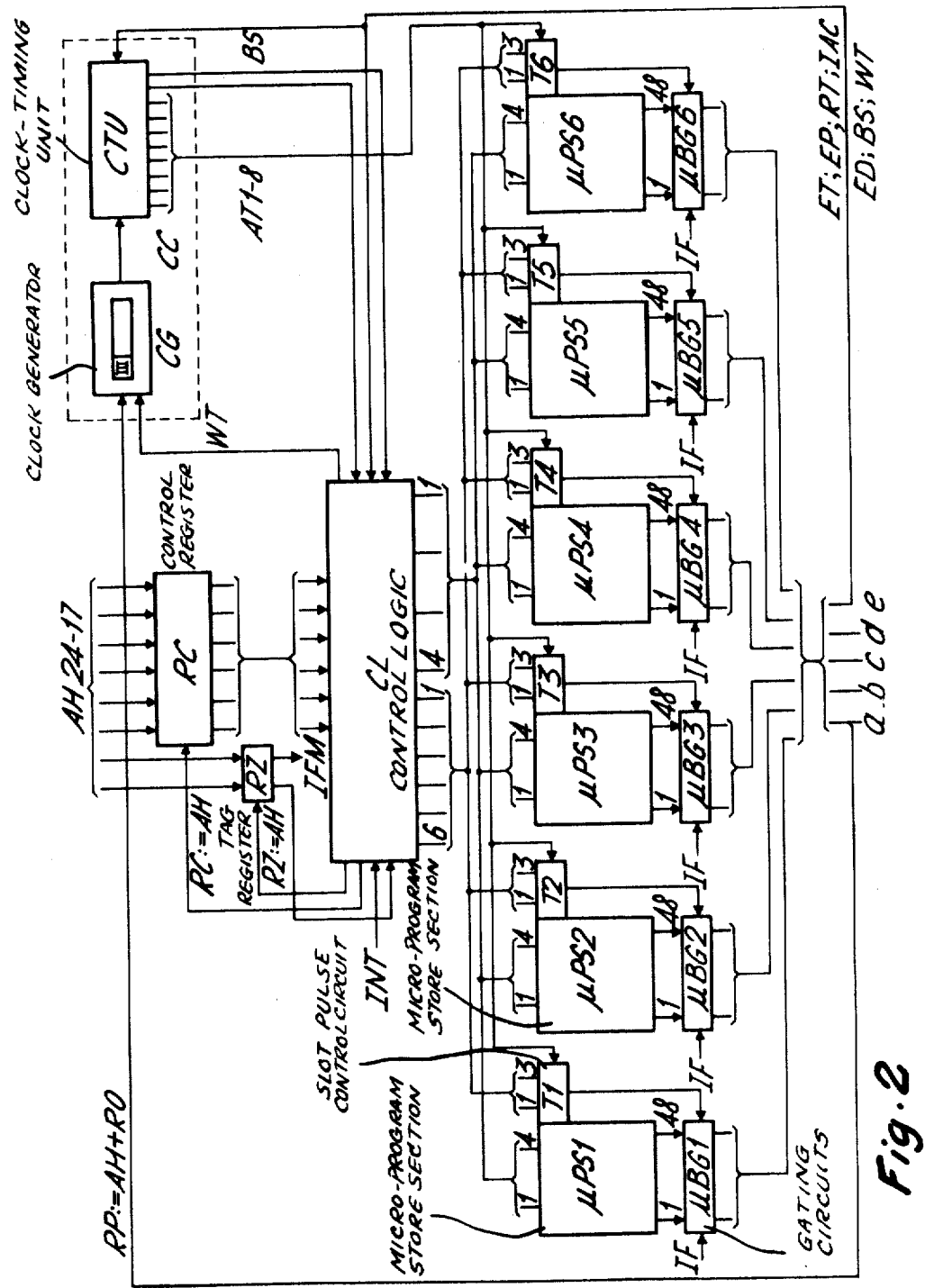

Consideration will now be given in more detail to the control unit and reference will be made to FIG. 2. When a new main programme instruction is selected the function digits bits 17–22 (Micro-address) of the instruction word are gated from the highway bits 17–22 into the control register RC, under the control of micro-bit signal RC:=AH from the control logic CL. This operation occurs in slot eight of the previous programme instruction. At the same time the instruction word tags, bits 23 and 24, are read from the highway into the tag register RZ under the control of micro-bit signal RZ:=AH. The new instruction micro-address is applied to the control logic so that it can be modified or inhibited. The modification arrangements of the micro-address will be considered later and as far as inhibition of the micro-address is concerned this will occur when an automatic instruction is required such as that used when the indirect address tag is marked, as the new instruction micro-address must be replaced with the micro-address which corresponds to the indirect address instruction. The operation of indirect addressing will be considered in more detail later.

When the indirect address tag is not marked and no other automatic instructions are required, the six-bits of the micro-address are applied to the micro-programme store via the control logic CL without modification and with the addition of a seventh bit. The use of the seventh bit, which is arranged to be the most significant bit of the binary coded micro-address at the output of the control logic CL, will be discussed later and will be considered as having at this stage a value of "0." The micro-address is split into two sections, bits 1–4 and bits 5 to 7. Bits 1–4 are used to define one out of sixteen addresses in each of the micro-programme store sections μPS1–μPS6, while bits 5 to 7, extended from the control logic CL in both normal and inverse form, are used to select one of the six micro-programme store sections. The actual selection operations performed by bits 5 to 7 of the micro-address "enable" a slot pulse control circuit, shown as T1–T6 in FIG. 2, for each micro-programme store section. A selection of up to forty-eight micro-bits can be made for each address in a micro-programme store section. In actual fact each micro-programme store section consists of a binary-to-linear code converter formed by diode gates, giving a one-out-of sixteen selection for each micro-address in that micro-programme store section, and three sixteen-by-sixteen diode matrices. Each output from the binary-to-linear converter forms a horizontal co-ordinate for each matrix and each horizontal has a "cross-point" associated with each of the sixteen vertical co-ordinates of the matrix. The matrix may conveniently be formed of printed circuit conductors on both sides of an insulating board, horizontal co-ordinates on one side and vertical co-ordinates on the other. Holes in the insulating board are positioned adjacent to each "crosspoint" of the matrix and diodes are connected across these cross-points as required. Hence each micro-address is capable of producing outputs on up to forty-eight leads. The forty-eight micro-bit output leads from each store section are connected individually to simple gating circuits such as μBG1, each gate (forty-eight in all) being controlled by one of the eight timing pulses from the associated slot pulse control circuit, circuit T1 in the case of circuit μBG1. Hence micro-bit signals are only generated at specific time slots within the instruction cycle. Certain gates in the gating circuits are controlled by "if conditions" indicated by the leads marked IF in FIG. 2 and supplied from certain functional parts of the data processing device and in those cases micro-bit signals are only generated when the "if conditions" are satisfied. Typical of these "if conditions" is a signal IFM. This signal is generated "if the modifier tag in the tag register RZ is set," indicating that the address section of the instruction word must be modified by the addition of the contents of the modifier register before the address is used in the main store unit. Each micro-bit signal controls a particular function controlling gate or gates in the computer (e.g. a set of gates connecting the inputs from the highway to a particular register) and obviously this function may be required in a number of different instructions. Hence a large proportion of the micro-bit signals will be duplicated and these signals are ORed to control the function controlling gate or gates. It will be seen from the above that although bits 1–4 of the micro-addresses are presented to all the micro-programme store sections μPS1–6 only those micro-bit signals in the store section effectively selected by micro-address bits 5–7 will be active.

The micro-bit signals can be divided into five functional groups: (a) register control micro-bits, (b) store control micro-bits, (c) arithmetic control micro bits, (d) peripheral control micro-bits and (e) cycle control micro-bits. The micro-bit signals shown in FIG. 1 controlling the various registers are typical of the functional group (a) (register control) micro-bit signals. The functional group (b) (store control) micro-bit signals μBSC are applied to the store control circuit SC (in FIG. 1a) and are instrumental in the generation of AND merge registers RR and RW into store (AND), READ (R), WRITE (W) and RE-WRITE (RR), store matrix MX control signals. The functional group (c) (arithmetic control) micro-bit signals are applied to the processor unit PROC and the accumulator register RL in the fast access store and are used to condition "under-flow," "over-flow," "carry control" and "size comparison" toggles as well as shift and add operations. The functional group (d) (peripheral control) micro-bit signals are used to control the signalling to and from the peripheral equipments (not shown) which are connected to the input/output unit I/OU over leads O/PD and I/PD. Finally the functional group (e) (timing cycle control) micro-bit signals are used exclusively in the control unit in the adaptation of the operation of that unit to accommodate alternative and modified forms of operation as required by specific instructions. Typically this final group of micro-bit signals control EXTEND (ET), EXPAND (EP), REPEAT (RT), INDIRECT ADDRESS CYCLE (IAC), END (ED), BYPASS (BS) and WAIT (WT) functions and the effects of these signals will be described with reference to FIGS. 4 and 6.

As mentioned previously the computer is synchronously operated under the control of the computer clock circuit CC. With reference to FIG. 2, it will be seen that the clock circuit CC consists of two sections, a clock generator CG and a clock timing unit CTU. The clock generator consists of a delay line oscillator which generates pulses at a periodicity which is equal to one quarter of the cycle time of the store matrix MX. In the case of a two micro-second cycle time store, the clock generator produces a square wave output having a 250 nano-second duration for each half wave. The square wave generated by the clock generator CG is passed to the clock timing unit CTU. The unit CTU consists basically of a eight stage pulse distributor producing a single 400 nano-second pulse output on each of eight output leads in succession with a 100 nano-second gap between each pulse. These pulses are called AT1–8 and with the associated 100 nano-second gap each define a 500 nano-second slot. The AT1–8 pulses are fed to all the timing circuits T1–6 of the microprogramme store sections μPS1–6 to control the timing of the extension of the micro-bit signals. The clock timing unit CTU also generates a supervisory pulse AT1S pulse for use in the control logic together with a reset strobe pulse. Pulse AT1S occurs between the AT8 and AT1 pulses. The reset strobe pulse is generated for each AT pulse and its configuration and uses will be considered later.

The micro-bit signals μBSC which control the operations of the main storage equipment MS are timed so that a READ operation is initiated in slot 2 (under the control of pulse AT2) and slot 6 (under the control of pulse AT6). WRITE operations, including RE-WRITE operations, are initiated in slot 4 (under the control of pulse AT4) and slot 8 (under the control of pulse AT8), each operation taking two slots in its performance. The READ operation initiated in slot 6 is normally concerned with reading the next programme instruction from the main store MS and the READ operation initiated in slot 2 is normally concerned with initiating the reading out of the data defined by the address section of the instruction word or preparing for the reception of processed data. Slot 8, therefore, is normally concerned with re-writing the programme instruction word back into the programme section of the main store matrix MS while slot 4 is normally concerned with initiating the rewriting of the slot 2 addressed data or writing computed data at the slot 2 addressed store location. The rest of the micro-bits required for any particular instruction are timed in accordance with the availability of the data, the highway and the registers or functional equipments required. A typical simple instruction will now be considered to clarify the comments made so far on the overall operation of the system.

The instruction chosen is the "transfer accumulator contents to store." The instruction word for this instruction will define, in bits 1–16, the address in the store into which the contents of the accumulator are to be written. The function section of the instruction word, bits 17–22, will define the micro-address in the micro-programme store μPS in FIG. 1 at which the micro-bits required to control the instruction are stored and it will be assumed that the modify tag bit 23 is marked and the indirect addressing tag, bit 24, is not marked.

Referring again to FIG. 1, the above mentioned word data will be read from the store MX into register RR in slot 6 of the previous instruction and will be transferred from the store output register RR into the control register RC (bits 17–22), the operator register RO (bits 1–16) and the tag register RZ (bits 23 and 24) in slot 8 of the previous instruction. The following table shows the micro-bits selected to handle the required transfer instruction and it should be remembered that the sign ":=" indicates a transfer from right to left of the expression and can be replaced by the word "becomes."

| Pulse time: | Function (micro bits) |
| --- | --- |
| AT1 | (IF MODIFY) AH:=RM; RP=RO+AH. |
| AT2 | AH:=RP; RA:=AH: READ. |
| AT3 | AH:=RL; RW:=AH. |
| AT4 | WRITE. |
| AT5 | |
| AT6 | RA:=RS; READ. |
| AT7 | RS:=RA+1. |
| AT8 | NXTOP. |

3(a) Slot 1

The micro-bit signals generated in this slot cause the contents of the modifier register RM to be transferred to the highway AH, if the modifier tag (bit 23 of the instruction word) is marked with a "1," and the contents of the operator register RO (address section of the instruction word) to be added to the data on the highway (modifier register contents), using the adder circuit AC, and the result of the addition to be placed in the processor register RP. This operation forms the modified address in the processor register RP.

3(b) Slot 2

The micro-bit signals generated in this slot cause the contents of the processor register RP (modified address) to be transferred to the store address register RA via the highway AH and the store matrix MX to be addressed for a READ operation at the modified address.

3(c) Slot 3

The micro-bit signals generated in this slot cause the contents of the accumulator register RL to be transferred, via the highway AH, to the store input register RW.

3(d) Slot 4

The micro-bit signal generated in this slot causes a WRITE operation to be initiated in the main store causing the data in the store input register RW (contents of accumulator register RL) to be written into the store location addressed by the contents of register RA (the address defined by the modified instruction word).

3(e) Slot 5

This slot is idle, no micro-bit signals being generated.

3(f) Slot 6

The micro bit signals generated in this slot cause the contents of the sequence control register RS (i.e. the next programme instruction address) to be passed to the store address register RA and the store matrix to be addressed for a READ operation at the next instruction address. This operation causes the next programme instruction word to be read from the store into the store output register RR.

3(g) Slot 7

The micro-bit signals generated in this slot cause the contents of the store address register RA to be increased by one and returned to the sequence control register RS. This operation forms the address of the "next-but-one" instruction ready for use in slot 6 of the next instruction.

3(h) Slot 8

The signal NXTOP generated in this slot by the control logic CL is used to control the routing of the next instruction word data to (a) the control register RC, bits 17–22 the M-address) (b) the operator register RO (bits 1–16 the data address), (c) the tag register RZ (bits 23 and 24) and (d) back to the addressed store location for a RE-WRITE operation. The signal NXTOP generates micro-bit signals

AH:=RR; RC:=AH; RO:=AH; RZ:=AH and RE-WRITE. The effects of signal NXTOP are to end the current instruction operation and prepare for the next instruction operations and the generated micro-bits can be seen with reference to FIG. 6 showing the logical diagram of the control unit CU in the control logic section CL.

(4) LOGIC ELEMENTS AND CIRCUITS

Before considering in detail the operation of the timing unit CTU and the control logic CL reference to FIG. 3 will be made. FIG. 3 shows the electronic circuit equivalent of (a) a three input AND gate (b) a three input NAND gate and (c) an inverter, together with the use of these elements in two types of D.C. toggles (d) and (e). The logic signals for all these devices can be considered as an earth signal for a "0" condition and a +V signal for a "1."

The AND gate shown in FIG. 3(a) operates as a positive gate being opened and providing a +V signal (i.e. a "1" state signal) output on lead OL when all inputs I1 to I3 are at the +V ("1") state. The NAND gate shown in FIG. 3(b) provides a "0" state output (i.e. an earth signal) on lead OA when all the inputs IA to IC are in the "1" state. A "1" state output is generated by this element when any one of the inputs IA to IC is in the "0" state. The inverter shown in FIG. 3(c) simply inverts the input signal on lead IZ so that a "1" state input signal causes a "0" state signal on lead OZ and a "0" state input signal causes a "1" state signal on lead OZ.

Figure 4:
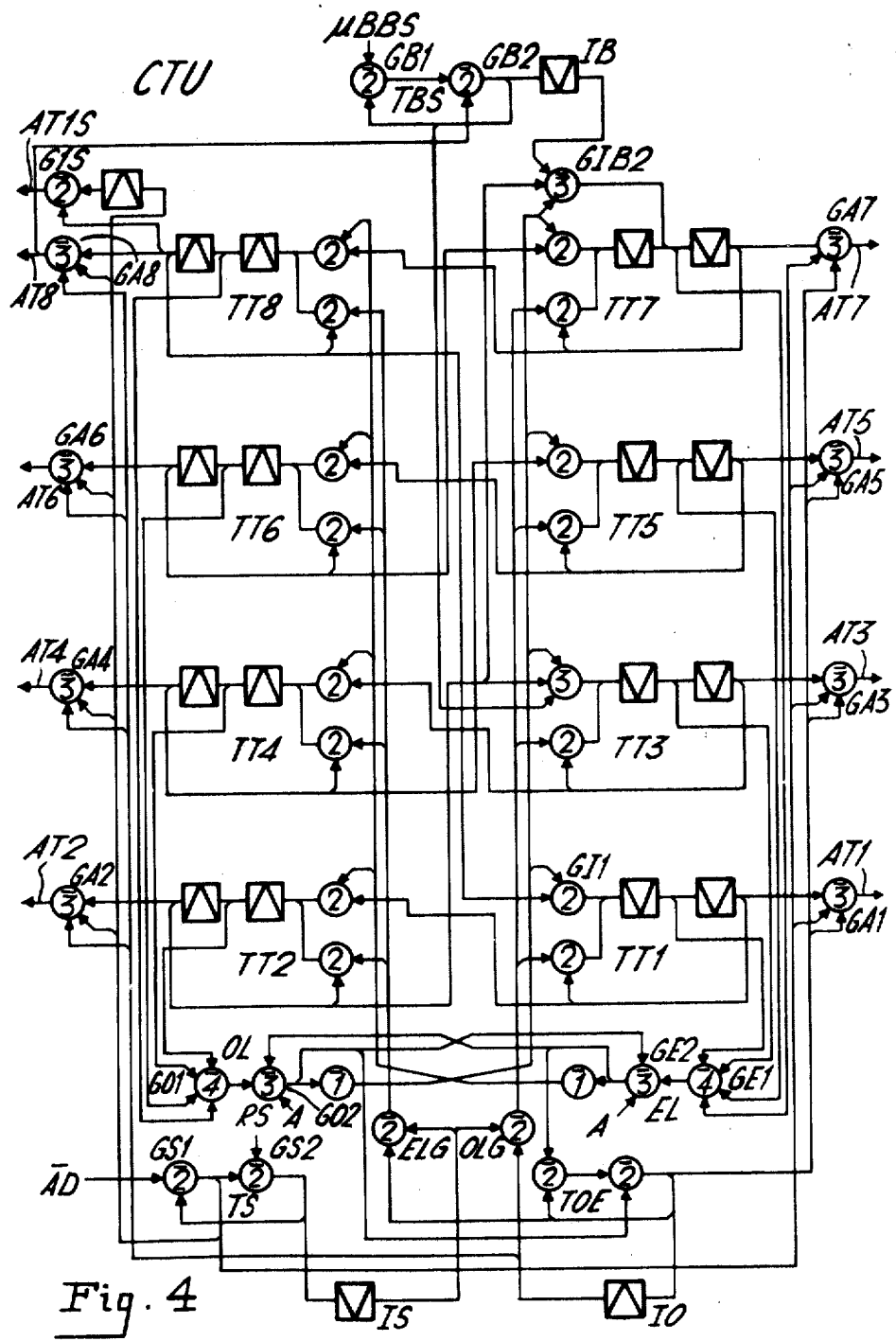
FIG. 4 shows a logical diagram of the timing unit in the control unit.

FIG. 3(d) shows one type of D.C. toggle which is used in the logic diagrams of FIGS. 4 and 6. This toggle TX provides a "0" state output on lead X and a "1" state output on lead $\overline{X}$ when the toggle is in the reset state. AND gate GL acts as the latch gate while AND gate GI acts as the toggle input gate. Under quiescent conditions lead RS/S, the reset strobe lead, is held in the "1" state and lead I/PC, the input data control lead is held in the "0" state. When it is required to transfer a data bit into the toggle or to change the state of the toggle, signal RS/S is pulsed to the "0" state breaking the toggle latch circuit (by closing gate GL). When the reset strobe lead RS/S returns to the "1" state lead I/PC is activated to the "1" state allowing the opening of gate GI if the input data on lead I/PD is in the "1" state. The opening of gate GI will cause a "0" state output from inverter I1 and, therefore, a "0" state output on lead $\overline{X}$. The switching of inverter I1 causes the switching of inverter I2 causing a "1" state output on lead X and the opening of gate GL. When the "1" state input data control lead I/PC returns to the "0" state the toggle remains set as gate GL is open. It should be noted that the AND gates, shown in FIG. 3a are provided with OR diodes in their output leads hence when the output leads on two AND gates are connected together they form a positive OR gate. Toggle TX is used as the basic element for each of the registers shown in FIGS. 1a and b and the input data control lead is under the control of the associated input control micro-bit signal.

FIG. 3(e) shows a second type of D.C. toggle using a pair of "back coupled" NAND gates of the type shown in FIG. 3b. In this case the input signal I/PS and the reset signal R are normally held in the "1" state, causing a "0" state output from the toggle on lead Y when reset. A "0" state pulse on lead I/PS causes a "1" state output from NAND gate G2 which is back coupled to gate G1 to latch the toggle when the "0" state input pulse is removed. To reset the toggle lead R is pulsed to the "0" state, switching gate G1 and therefore "breaking" the latch signal. When the toggle is set lead Y assumes the "1" state while lead $\overline{Y}$ assumes the "0" state. Toggle TY is used mainly in the control logic equipment CL and signal I/PS may conveniently correspond to a micro-bit signal.

(5) THE CONTROL UNIT CU CLOCK TIMING UNIT CTU

Figure 5:
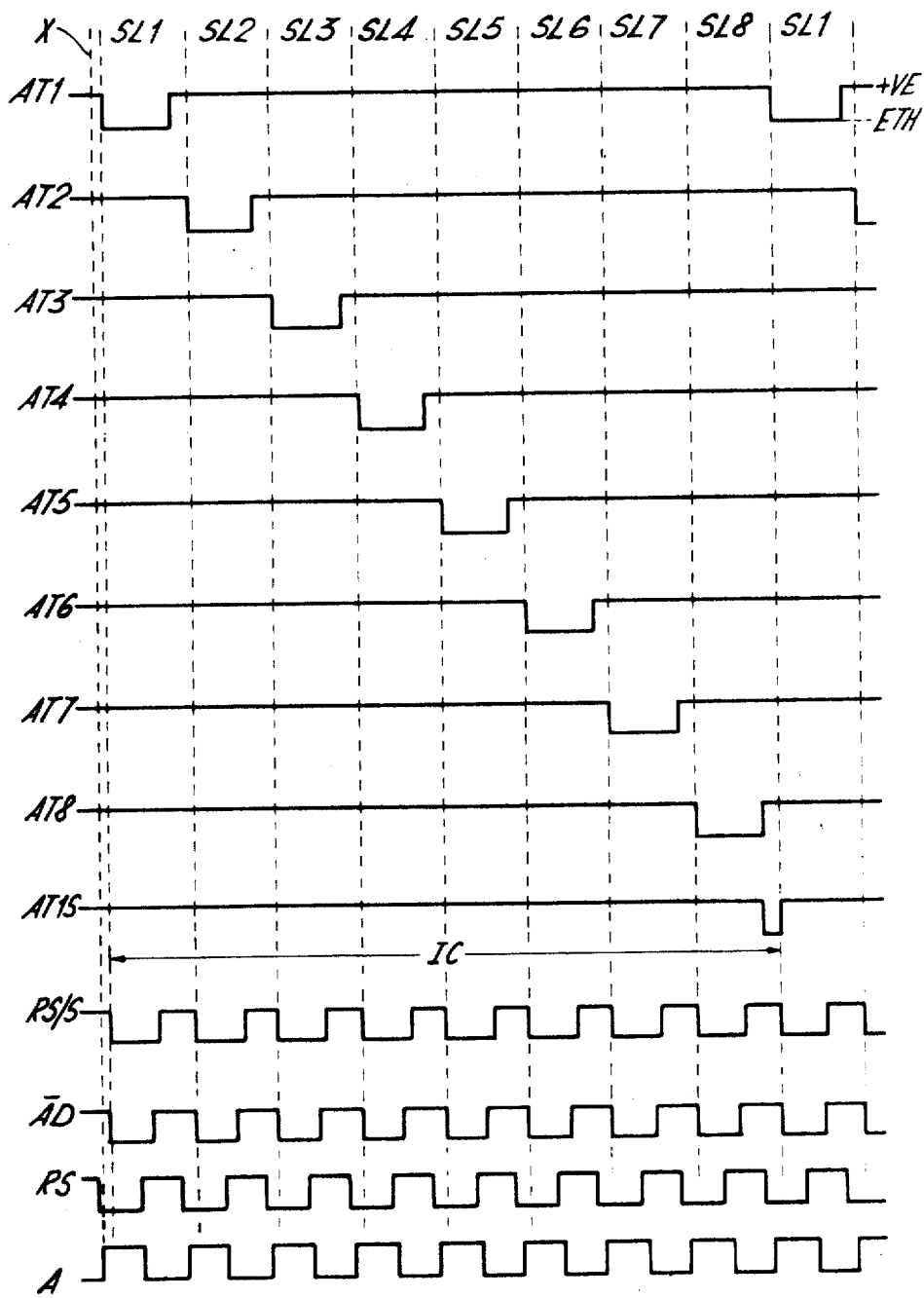

As mentioned previously the data processing device is synchronously operated on an eight slot basis. The control clock CC in FIG. 1, is a delay line oscillator which generates a basic 250 nano-second square wave output given the reference A (FIG. 5). From this signal a signal "$\overline{A}$ delayed" is produced, referenced $\overline{AD}$, which is approximately 100 nano-seconds delayed with respect to the basic square wave and inverted with reference to that square wave. Certain other waveforms are generated by the control clock by gating further delayed signals with each other and these signals are shown together with A and $\overline{AD}$ at the bottom of FIG. 5. The bottom three signals $\overline{AD}$, RS and A are applied to the timing unit CTU while signals AT1–AT8 and AT1S are generated by the timing unit CTU shown in FIG. 4. This unit consists of an eight bit digit distributor using D.C. toggles TT1 to TT8 and timing and control logic shown below toggles TT1 and TT2 in FIG. 4. Toggles TT1 to TT8 are of the same form as toggle TX in FIG. 3(d) while the control toggles TS, TOE and TBS are of the same form as toggle TY in FIG. 3(e).

5(a) Generation of AT pulses

It will be assumed that toggle TT8 (FIG. 4) is set and the circuit is awaiting the occurrence of the next "1" state excursion of signal A. This point is indicated at the first dotted line marked X in FIG. 5. The odd/even toggle TOE will be in the reset state providing a "0" state output to gate ELG and inverter IO. The shift toggle TS will be reset at this stage providing a "0" state output to the timing unit output NAND gates GA1 to GA8 and a "1" state input gate G16 and to inverter IS.

The set state of toggle TT8 causes a "1" state output from NAND gate GO1 in the odd logic control OL, thus preparing for the next "1" state excursion of signal A. NAND gate GE1 at this stage will be producing a "0" state output as toggles TT1, TT3, TT5 and TT7 are all reset. The "0" state output from NAND gate GE1 causes a "1" state output from NAND gate GE2.

When the next "1" state excursion of signal A occurs, NAND gate GO2 is opened producing a "0" state output. The "0" state output of gate GO2 sets the odd/even toggle TOE and after inversion allows toggle TT1 to set (its data input AND gate GI1 being opened as toggle TT8 is set). The timing unit now waits for the occurrence of the next "0" state excursion of signal AD.

When the next "0" state excursion of signal $\overline{AD}$ occurs the input NAND gate GS1 of the shift toggle TS is switched to produce a "1" state output. This output together with the set state of toggle TT1 and the set state of the odd/even toggle TOE causes a "0" state output from NAND gate GA1, and, therefore, the start of the AT1 slot pulse. This can be seen on waveform AT1 in FIG. 5.

It should be noted that the shift toggle TS has not as yet fully changed its state as the reset shift signal RS is at this stage in the "0" state inhibiting NAND gate GS2. Toggle TT8 is also still set at this time, however gate GA8 will not produce a "0" state output as toggle TOE is set and the output from inverter IO will be in the "0" state. The timing unit now waits for the next "1" state excursion of signal RS.

When the next "1" state excursion of signal RS occurs, NAND gate GS2 will change its output state to a "0" causing a "1" state output from inverter IS and thus completing the setting of the shift toggle TS. The "1" state output from inverter IS causes a "0" state output from NAND gate ELG (as the odd/even toggle is in the set state at this stage). The output of gate ELG is applied to the latch gates for toggles TT2, TT4, TT6 and TT8, hence all these toggles are reset. In actual fact only toggle TT8 was set and therefore the "0" state output from gate ELG only resets toggle TT8. The resetting of toggle TT8 causes a "0" state output from NAND gate GO1 and consequently a "1" state output from NAND gate GO2. However, as can be seen from FIG. 5, signal A has returned to the "0" state at this time so NAND gate GE2 remains closed.

Some 100 nano-seconds after the return to the "0" state of signal A, signal $\overline{AD}$ will change to the "1" state. This has no effect on the shift toggle as the set state thereof is preserved by the feed-back loop from gate GS2. Gate GS2 is under the control of signal RS which, as can be seen in FIG. 5, is in the "1" state at this point. The timing unit now waits for the next "0" state excursion of signal RS.

When signal RS is switched from the "1" to the "0" state the shift toggle TS is reset closing NAND gate GA1 thus terminating the production of the AT1 slot pulse.

With reference to FIG. 5, it will be seen that the "1" to "0" state-going edge of the $\overline{AD}$ signal defines the start of the AT slot pulse while the "1" to "0" state-going edge of the RS signal defines the end of that AT slot pulse. The actual length of the slot pulse is arranged to be of the order of 400 nano-seconds making the reset shift signal RS 400 nano-seconds delayed from the $\overline{AD}$ signal or one complete cycle delayed from the A signal and inverted with respect to that A signal.

It will be appreciated that for each "1" state-going change of signal A, the next higher numbered toggle will be set, together with the changing of state of the odd/even toggle; for each "0" state going change of the $\overline{AD}$ signal, the corresponding AT pulse is started; for each "1" state going change of the RS signal, the shift toggle is set and the previous AT pulse controlling toggle is reset and for each "0" state going change of the RS signal the shift toggle is reset and the AT pulse is terminated. The full instruction cycle IC is shown in FIG. 5.

5(b) Shortening of instruction cycle

Under certain conditions it may be advantageous to shorten the instruction cycle and this will occur in those cases when an instruction dictates that only one access operation on the main store is required. An example of such an instruction is the transfer of the address information in an instruction word to the modifier register to change the address modifier. In this case it is required to access the store in the previous instruction to retrieve the instruction word data, however, it is only necessary to address the store in the current instruction to retrieve the next instruction word data. In this case the micro-bits selected would be as shown in the following table:

| Pulse time: | Function (micro-bits) |
|---|---|
| AT1 | (IF MODIFY) AH:=RM; RP:=AH+RO. |
| AT2 | RA:=RS; READ AH(1 to 16):=RP; RM(1:16):=AH; BYPASS. |
| AT7 | RS:=RA+1. |
| AT8 | NXTOP. |

5(b)i Slot 1

The micro-bit signals generated in this slot cause the contents of the operator register RO to be transferred in the processor register RP, modified if required.

5(b)ii Slot 2

The micro-bit signals generated in this slot cause the sequence number to be passed to the address register RA and a READ operation to be performed (i.e. preparation of next instruction) and the new modifier, in register RP, to be passed to the modifier register RM. A timing cycle control micro-bit signal BYPASS is also generated in this slot.

This signal is passed to the timing control unit CTU as an earth-going signal on lead $\mu$BBS (in FIG. 4) under the control of pulse AT2. Signal BYPASS causes the setting of the bypass toggle TBS as NAND gate GB1 produces a "1" state output under the control of that signal and the output of gate GA8 at this stage will be a "1."

The "0" state output from gate GB2 is used (a) to inhibit the input gate for toggle TT3 and, (b) after inversion by inverter IB, to prime the additional NAND gate GIB2 associated with toggle TT7. Hence when the next A pulse occurs the digit distributor steps from toggle TT2 to toggle TT7 thus by passing slots 3, 4, 5 and 6.

5(b)iii Slot 7

The micro-bit signals generated in this slot cause the sequence control number to be incremented.

5(b)iv Slot 8

The signal NXTOP generated in this slot causes the selection of the next instruction whose data word was read from the store in slot 2.

5(c) Generation of the pre-instruction start signal

Finally consideration must be given to the generation of the "pre-instruction start" signal AT1S (FIG. 4) by the timing control unit CTU. This signal is generated by gate G1s under the control of toggle TT8 and the reset state of the shift toggle TS. Signal AT1S is initiated at the end of the AT8 pulse and is terminated at the start of the next instruction cycle AT1 pulse. Signal AT1S is used in the control logic CL and its significance will be seen with reference to FIG. 6.

(6) The control unit CU control logic CL

Figure 6A:
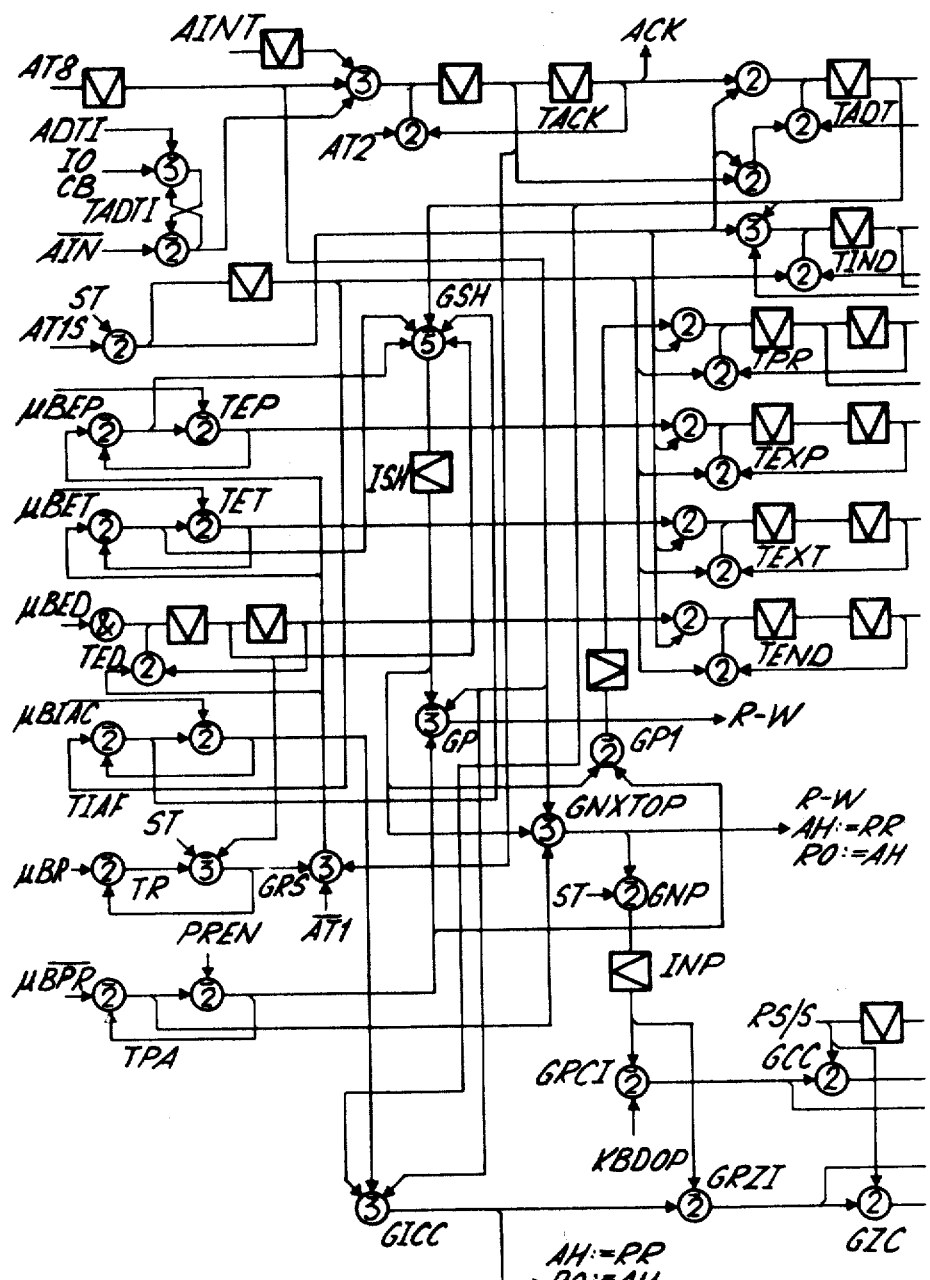
FIGS. 6a and 6f show logical diagrams of the control register and control logic of the control unit.
Figure 6B:
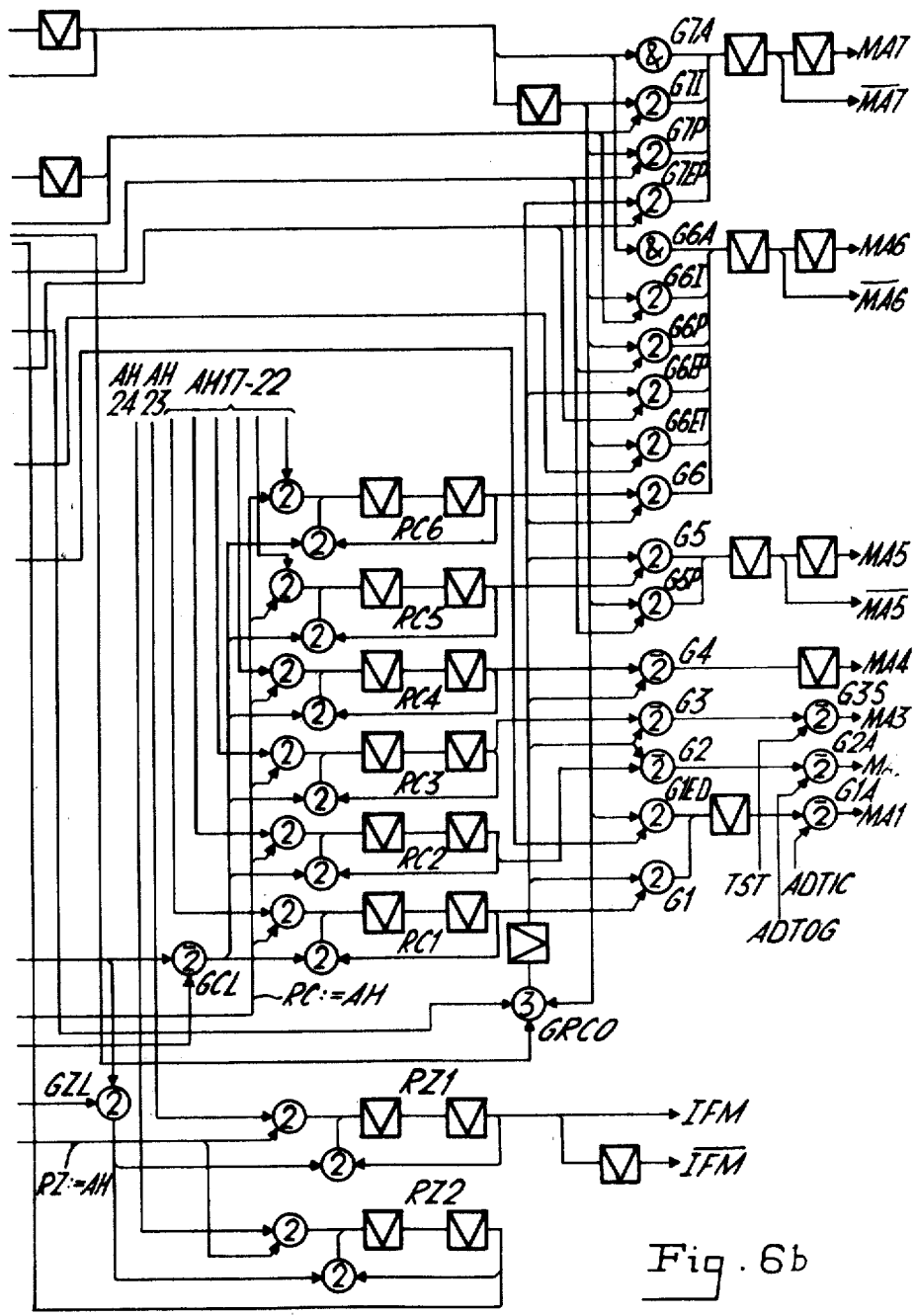

This logic will be seen with reference to FIGS. 6a and 6b. These figures should be placed side-by-side with FIG. 6a on the left. It was mentioned previously that the exit from an instruction is made by generating, in slot 8 under the control of pulse AT8, a signal NXTOP. This signal is generated under the control of NAND gate GNXTOP which is opened by (a) signal $\overline{AT8}$ (b) a "1" state signal from inverter ISH and (c) the reset output from toggle TPA.

The "0" state output from NAND gate GNXTOP is used to generate directly micro-bit signals, R–N (Rewrite), AH:=RR and RO:=AH. These micro-bit signals control the transfer of the instruction word on to the highway, the reading in to the operator register of the address data and the re-writing of the instruction word into the main store. The "0" state output of gate GNXTOP is inverted by NAND gate GNP and re-inverted by inverter INP. The "0" state output from inverter INP causes a "1" state output from NAND gates GRCI and GRZI. The outputs of gates GRCI and GRZI are used to control the latch control NAND gates GCL and GZL for registers RC and RZ respectively. Gates GCL and GZL are fed with the inverted reset strobe signal RS/S. A waveform indicative of this RS/S signal can be seen in FIG. 5.

Gates GCL and GZL are opened for substantially the duration of the "0" state excursion of the reset strobe signal in slot 8 and as these gates provide "0" state outputs to the latch gates of the RC and RZ toggles all these toggles become reset.

At this stage the micro-address and tag sections of the instruction word will be on the highway, however, the toggles in the control register RC and the tag register RZ will not be affected by the highway data as the input data control leads for these toggles are under the control of AND gates GCC and GZC. Gates GCC and GZC at this stage are inhibited by the "0" state condition of the rescet strobe signal RS/S. Registers RC and RZ have, therefore, been cleared and are awaiting the occurrence of the "1" state excursion of the reset strobe signal RS/S.

When the reset strobe signal changes from the "0" state to the "1" state, gates GCC and GZC are opened and the micro-address and tag data is read into the control register RC and the tag register RZ under the control of signals RC:=AH and RZ:=AH.

The outputs of the control register RC are gated, by the inverted "0" state output of NAND gate GRCO, and passed to the micro-programme store to select the micro-bits required for execution of the micro-address defined instruction. NAND gate GRCO is controlled by the reset outputs of toggles TACK, TIND and TPR and, therefore, if any of these toggles are set, the extension of the new micro-address is inhibited. The significance of this gate will be seen later.

The outputs of the tag register toggles are used to provide "if modify" and "not if modify" conditions to the "if condition" inputs of the micro programme store (RZ1) and to control the selection of an indirect address operation if that tag is marked (RZ2).

6(a) Automatic instructions indirect address: indirect address tag marked

In this case toggle RZ2 will be set by a "1" state condition on bit 24 of the highway when signal RZ:=AH is generated. When an indirect address operation is called for the control logic must arrange that the execution of the current instruction in inhibited until the current address data has been replaced with the data stored at the instruction word address.

When toggle RZ2 is set, the "1" state output so produced is fed to the input data AND gate on the indirect address control toggle TIND. This "tag marked" signal is gated with the reset output of the autonomous data transfer (ADT) toggle TADT and the inverted timing signal AT1S. Toggle TIND is also fed with timing signal AT1S on its latch control gate. Toggle TIND is reset at the end of slot 8, by the AT1S pulse, and is set at the end of this pulse (i.e. at the start of slot 1) if the indirect address tag is marked (toggle RZ2 set) and if no ADT interrupt has been received.

The setting of toggle TIND causes (a) NAND gate GRCO to be inhibited stopping the extension of the micro-address of the new instruction to the micro-programme store, although this micro-address is still held in the control register RC, and (b) if toggle TADT is reset, the forcing of a discrete micro-address at the output of the control register which defines the "automatic" instructions required. The actual M-address formed is 0000011 for bits 1–7. This is performed by opening gates G7I and G6I while holding the normal output gating control gate for the control register (gate GRCO) closed. The micro-bits selected by the "automatic" indirect address instruction would be as shown in the following table:

| Pulse time: | Function (micro-bits) |
|---|---|
| AT1 | (IF MODIFY) AH:=RM; RP:=AH+R₃O. |
| AT2 | AH:=RP; RA:=AH; READ; BYPASS; IAC. |
| AT7 | Idle. |
| AT8 | NXTOP. |

6(a)i Slot 1

The micro-bit signals generated in this slot cause the indirect address, in the operator register RO, to be passed to the processor register RP after modification if required.

6(a)ii Slot 2

The selected micro-bit signals generated in this slot cause the modified indirect address to be passed to the store and a read operation to be performed in that address. Timing cycle control and control logic control micro-bit signals BYPASS and IAC are also generated in this slot. The signal BYPASS ($\mu$BBS) has been considered previously with reference to FIG. 4 in section 5(b)ii above and it is used to bypass slots 3, 4, 5 and 6. The signal IAC shown as $\mu$BIAC in FIG. 6a is used to set the indirect address cycle flag (toggle TIAF in FIG. 6a).

The setting of toggle TIAF primes NAND gate GICC ready for the occurrence of the AT8 pulse generated at the end of the indirect address instruction cycle.

6(a)iii Slot 7

No micro-bit signals are generated in this slot period. It is, therefore idle, however the read operation initiated in slot 2 will be continuing in this slot.

6(a)iv Slot 8

The occurrence of the AT8 slot pulse after inversion causes a "0" state output from NAND gate GICC. The switching of gate GICC causes the generation of micro-bit signals AH:=RR, RO:=AH and R–W in a similar manner to gate GNXTOP. It should be noted that gate GNXTOP is inhibited at this stage as the set conditions of toggle TIAF causes a "1" state output from the "stretch" NAND gate GSH and a consequent "0" state output from inverter ISH.

The "0" state output from gate GICC is also used to produce a "1" state output from NAND gate GRZI, allowing the resetting of the tag register toggles and the reading in of new modifier and indirect address tags, as provided by the new address word on the highway, when the reset strobe signal RS/S returns to the "1" state. The control logic now awaits the occurrence of the AT1S timing pulse.

When timing pulse AT1S occurs toggle TIND and TIAF are reset causing the removal of the forced automatic instruction micro-address. If a set of indirect addresses have been "nested," the indirect address tag will again be marked and the above indirect address routine is repeated. The indirect address instruction will be repeated until the indirect address tag is not marked and then the instruction defined by the micro-address in the control register RC will be performed as the resetting of toggle TIND removes the inhibit on the output AND gates G1–G6 of this register provided by NAND gate GRCO. Three other automatic instructions are included in the computer and they are (i) priority interrupt, (ii) autonomous data transfer interrupt incoming (ADTIC) and (iii) autonomous data transfer outgoing (ATDOG).

6(b)i Automatic instruction priority interrupt

A priority interrupt signal will occur during the running of a programme in a time-sharing computer if a programme assigned a higher priority demands access to the computer. As soon as the current instruction has been completed, the parameters of the interrupted programme must be stored and the new programme allowed to start. The storage of the parameters of the interrupted programme are performed under the control of a "director programme" which is entered when the priority interrupt is detected. Further priority interrupts are inhibited until permitted by the director programme.

A "0" state signal PREN (Prior Enable) is generated when a priority interrupt occurs, assuming that no other priority interrupt is in progress at that time. This signal sets the priority accept toggle TPA in FIG. 6a which inhibits gate GNXTOP and primes gate GP. The control logic now waits until slot 8 of the end of the current instruction. This performed by inhibiting NAND gate GP with the inverted output of the stretch NAND gate GSH. The inhibit will only be removed when toggles TEP (expand flag toggle), TET (extend flag toggle), TIAF (indirect address cycle flag toggle), TADT (ADT toggle) and TED (end flag toggle) are all reset. The significance of these various toggles will be considered later, however, it can be assumed at this point that the reset condition of all these toggles indicates that when slot 8 occurs the current instruction is complete.

When the slot pulse AT8 occurs at the end of the current instruction, NAND gate GP is opened and the "0" state output from this gate is used to generate a re-write micro-bit signal. The generation of the re-write signal causes the next instruction of the interrupted programme, which was read from the store in slot 6 (or slot 2 if BYPASS was used in the previous instruction) of the interrupted programme's last instruction, to be re-written into the store. Gate GP1 is also open at this stage and, upon the occurrence of the end of the AT1S pulse, the priority toggle TPR is set.

The setting of the priority toggle TPR causes (a) the inhibiting of the control register output AND gates G1–G6 by closing NAND gate GRCO and (b) the forcing of the priority interrupt automatic instruction micro-address (0000111) bits MA1–7 by opening AND gates G7P, G6P and G5P. The micro-bits selected by the priority interrupt automatic instruction may take the form as shown in the following table:

Pulse time:            Function (micro-bits)
AT1 _____ Idle.
AT2 _____ AH:=RA; RE:=AH; RE:=PARAM.
AT3 _____ Idle.
AT4 _____ Idle.
AT5 _____ RO:=$\overline{AH}$.
AT6 _____ AH:RO; RA:=AH; READ $\overline{PRIORITY}$.
AT7 _____ Idle.
AT8 _____ NXTOP.

6(b)i(i) Slot 1

No micro-bits are generated in this slot.

6(b)i(ii) Slot 2

The micro-bit signals produced in this slot cause the sequence control number of the interrupted programme in the address register RA to be transferred into the extra register RE. The parameters (overflow, size comparison and carry), are also passed to the extra register RE, bits 22, 23 and 24 respectively in this slot.

6(b)i(iii) Slot 3

Idle.

6(b)i(iv) Slot 4

Idle.

6(b)i(v) Slot 5

The micro-bit signal produced in this slot causes the inverse of the highway to be written into the operator register RO. As the highway is idle at this point all "1's" will be written into the operator register.

6(b)i(vi) Slot 6

The micro-bit signals produced in this slot cause the contents of the operator register RO to be transferred to the address register RA and a read operation to be performed on the store at the all "1's" address. This address is arranged to store the start address for the director programme. A micro-bit signal $\overline{PRIORITY}$ ($\mu\overline{BPR}$) is also generated in this slot and this is used to reset the priority accept toggle TPA.

6(b)i(vii) Slot 7

Idle.

6(b)i(viii) Slot 8

The occurrence of the AT8 slot-pulse causes the opening of gate GNXTOP with the effects detailed above in section 6(a)iv with the exception that toggle TPR is reset at AT1S. The reset of toggle TPR removes the priority interrupt automatic instruction micro-address from leads MA1–7 and removes the inhibit from the control register RC output gates. The first instruction of the director programme is therefore, selected (i.e. that instruction defined by main programme address, all ones).

Priority interrupts are fed into logic circuits (not shown) in the input/output unit I/OU in FIG. 1 which decide whether they are of higher priority than the current programme. Interrupts of higher priority are fed to the computer to produce signal PREN immediately while those of lower priority are stored for future action. As seen above the detection of a priority interrupt signal causes a jump to be made by the computer to a fixed location (i.e. the all "1's" address). This address is used as the start address of the director programme.

The director programme caters for eight categories of interrupt and twelve main core store locations are allocated for each priority category, making 96 locations in all. The purpose of these locations is to provide storage for the data relating to the programme that has been interrupted together with the start address for the interrupting programme. A sub-routine in the director programme causes the register contents and the address of the next instructive of the interrupted programme to be stored in the block of storage allocated in the priority level of the interrupting programme.

A second type of interrupt is provided in the computer and this is again under the control of either of two automatic orders. This interrupt is used on autonomous data transfer operations.

6(c) Autonomous data transfer automatic instruction

In an on line system arrangements must be provided for accepting or transmitting data substantially on demand from the external equipment. Hence the autonomous data transfer interrupt must be of higher priority than the highest priority interrupt and must be dealt with as soon as possible.

The autonomous data transfer (A.D.T.) interrupt signal AINT can occur at any time, however it is only accepted at the end of the instruction cycle currently in progress in the computer. When the AT8 slot pulse occurs, toggle TACK is set assuming the A.D.T. inhibit toggle TADTI is reset. Consideration will be given to this interrupt inhibit toggle at the end of this section.

The setting of toggle TACK produces a signal ACK which is passed back to the A.D.T. interrupt originating equipment to acknowledge the interrupt signal and primes the input gate for toggle TADT. The set condition of toggle TACK also on its reset output inhibits the reset NAND gate GRS.

When pulse AT1S occurs, toggle TADT is set and the autonomous data transfer automatic instruction is selected by opening gates G7A and G6A. The AND gates fed by the indirect address toggle TIND will be inhibited by the set condition of TADT and this condition also inhibits the output gates G1–G7 on the control register RC by closing NAND gate GRCO. Toggle TADT at its reset output causes the activation of the STRETCH logic by closing NAND gate GSH. The control unit is now set up ready to control the execution of the autonomous data transfer automatic instruction. It should be noted, however that two automatic instructions are required, one for incoming transfers and the other for outgoing transfers. The type of transfer required is indicated by the interrupt originating equipment and either signal ADTIC or ADTOG respectively will be produced.

6(c)a An A.D.T. incoming automatic instruction

This is specified by a micro-address of 100011 for leads MA1–7 and selects the following micro-bits.

| Pulse time: | Function (micro-bits) |
|---|---|
| AT1 | AH:=SX; RW:=AH. |
| AT2 | AH:=RI; RA:=AH; READ. |
| AT3 | AH:=RS; RI:=AH. |
| AT4 | RS:=RA+1; WRITE. |
| AT5 | RA:=RS. |
| AT6 | AH:=RI; RS:=AH. |
| AT7 | AH:=RA; RI:=AH. |
| AT8 | Idle. |

6(c)ai Slot 1

The micro-bit signals generated in this slot cause the input data, stored in register SX (FIG. 1), to be transferred to the main store input register RW.

6(d)aii Slot 2

The micro-bit signals generated in this slot cause the A.D.T. input address, held in the interrupt address register RI, to be passed to the address register RA and a READ operation to be performed at that main store location. Toggle TACK is also reset in this slot.

6(c)aiii Slot 3

The micro-bit signals generated in this slot cause the sequence control number of the interrupted programme to be passed for temporary storage in the interrupt register RI.

6(c)aiv Slot 4

The micro-bit signals generated in this slot cause the A.D.T. interrupt address to be increased by one and the store to be conditioned to write the received data into the slot 2 address store location.

6(c)av Slot 5

The incremented interrupt address is passed from the sequence control number register RS to the address register RA in this slot.

6(c)avi Slot 6

The interrupted programme's sequence control number is written back into the sequence control number register RS in this slot.

6(c)avii Slot 7

The incremented interrupt address is written back into the interrupt register RI in this slot.

6(c)aviii Slot 8

This slot is idle as far as the selected micro-programme store unit is concerned, however, the control logic is returned to the state which was appertaining at the start of the A.D.T. automatic instruction (i.e. that condition encountered at the end of the previous instruction cycle) at the end of this slot under the control of pulse AT1S. Toggle TADT is reset when this pulse occurs, removing the automatic instruction micro-address from leads MA1–7 and allowing the micro-address in the control register RC to control the operation of the data processing device.

6(c)b A.D.T. outgoing automatic instruction

This is specified by a micro-address of 0100011 for the leads MA1–7 and the execution is very similar to that shown for the A.D.T. incoming instruction. The following table shows the actual micro-bits signals used.

| Pulse time: | Function (micro-bits) |
|---|---|
| AT1 | Idle. |
| AT2 | AH:=RI; RA:=AH; READ. |
| AT3 | AH:=RS; RI:=AH. |
| AT4 | AH:=RR; RU:=AH; REWRITE; RS:=RA+1. |
| AT5 | RA:=RS. |
| AT6 | AH:=RI; RS:=AH. |
| AT7 | AH:=RA; RI:=AH. |
| AT8 | Idle. |

From the above it can be seen that the outgoing data is transferred to the output register RU in slot 4. Toggles TADT and TACK perform identical functions in this instruction to those shown in section 6(c)a above.

It was mentioned above, in section 6(c), that the A.D.T. acknowledge toggles TACK inhibited the reset NAND gate GRS. This gate controls the reset of the EXTEND, EXPAND, and END toggles which are used together with the REPEAT toggle in instructions which require more than one instruction cycle to perform their operation.

6(c)c A.D.T. inhibit

As mentioned previously the A.D.T. acknowledge toggle TACK is under the control of the A.D.T. inhibit toggle TADTI. This toggle is set when an input or output data transfer operation is in progress by the signal IOCB. This signal is generated from the micro-bit signals used to control the data transfer. Toggle TADTI can also be set by the signal ADTI which is an inhibit A.D.T. signal. The inhibit toggle TADTI is reset by a micro-bit signal $\overline{\text{AIN}}$ when for example the data transfer operation is complete.

6(d) Instructions requiring more than one instruction cycle

In certain cases, such as complex arithmetic instructions and input/output transfer control instructions, a plurality of functions are embodied in the one instruction. In these compound instruction cases it is necessary to access the micro-programme store on one or more additional occasions and this is performed under the control of the EXTEND and EXPAND micro-bit signals. Additionally instructions may require iterative operations where a set of functions of an instruction cycle within a compound instruction have to be repeated until a specified iteration count is complete. Typical of such iterative operation compound instructions are the multiply, divide, shift, standardise (floating point) input and output data transfer instructions. These compound instructions are controlled by REPEAT and END micro-bit signals in addition to the EXPAND and/or EXTEND micro-bit signals.

Consideration will now be given to a multiply instruction which embodies all the above mentioned instruction cycle control micro-bit signals.

6(d)a Multiple instruction

Before commencing this instruction the programme should:

(1) Store the modifier, as the modifier register is used in this instruction for storing twice the multiplicand;
(2) Place the multiplicand in the accumulator; and
(3) Place the multiplier in the auxiliary register.

The iteration count is held as the complement plus 1 in the instruction word address section and cannot be modified directly.

The operation of the instruction is basically to look at the two least significant bits of the multiplier and add 0, 1, 2, or 3 times the multiplicand to the partial product, right shifting the partial product and multiplier two bits each time.

The resultant is arranged to lie with the most significant 24 bits in the accumulator and the least significant 23 bits in the auxiliary register.

The actual micro-address placed in the control register RC under the control of the instruction word for a multiply operation will be assumed to be 0100100 for leads MA1–7 in FIG. 6b. This means that the first set of micro-bits for this instruction are stored at location number two in micro-programme store unit μPS2 in FIG. 2.

The following table shows the micro-bits selected by the specified micro-address:

| Pulse time: | Function (micro bits) |
|---|---|
| AT1 | RP:=RO+AH. |
| AT2 | Idle. |
| AT3 | Idle. |
| AT4 | AH:=RP; RO:=$\overline{\text{AH}}$; +1. |
| AT5 | RP:=RO=AH+1. |
| AT6 | RA:=AH, READ. |
| AT7 | AH:=RS; RW:=AH; EXTEND. |
| AT8 | WRITE. |

6d(a)i Slot 1

The micro-bit generated in this slot causes the iteration count held in the operator register RO to be passed to the processor register RP.

6d(a)ii Slot 2

Idle.

6d(a)iii Slot 3

Idle.

6d(a)iv Slot 4

The iteration count, held in the processor register RP, is inverted and transferred into the operator register RO in this slot.

6d(a)v Slot 5

The operations performed in this slot cause the complement +1 of the iteration count to be placed in the processor register RP.

6d(a)vi Slot 6

Store address "all zero's" is selected and read in this slot, as the highway will be idle at this point. The "all zero's" address in the store is normally kept empty and in this instruction it is used to store the sequence control number of the next instruction in the current programme as the sequence control number register RS is to be used to hold the iteration count.

6d(a)vii Slot 7

The sequence control number is passed from register RS to the store input register RW in this slot and the micro-bit signal EXTEND is generated. This micro-bit signal is shown in FIG. 6(a) as μBET and it sets the extend flag toggle TET. The setting of toggle TET on its reset output activates the "stretch" logic by closing NAND gate GSH and, therefore, inhibits NAND gate GNXTOP.

6d(a)viii Slot 8

The micro-bit signal WRITE generated in this slot causes the sequence control number to be written into the store location specified by the "all zero's" address. The extend toggle TEXT is set at the end of this slot by the set condition of toggle TET and timing pulse AT1S.

The setting of toggle TEXT causes bit 6 (lead MA6) of the micro-address to be changed to a 1 by opening AND gate G6ET. It should be noted that leads MA1–5 remain in the s tate defined by the control register RC and, therefore, a new micro-address of 0100110 (leads MA1–7) is formed. The newly formed micro-address is used to retrieve a second set of micro-bits for this instruction and these micro-bits are stored in micro-programme store unit μPS4 at location 2.

6(d)b Second-set of micro-bits for multiply instruction

The following table shows the micro-bits stored at the location defined by micro-address 0100110:

| Pulse time: | Function (μ-bits) |
|---|---|
| AT1 | AH:=RP; RS:=AH. |
| AT2 | AH:=RL; RP:=AH; RO:=AH. |
| AT3 | AH:=2RP; RM:=AH. |
| AT4 | AH:RM; RP:=RO+AH. |
| AT5 | AH:=RP; RE:=AH; RF:=AH (26, 25); STT:=R×24. |
| AT6 | RA:=RS; RO:=AH REPEAT; EXPAND. |
| AT7 | AH:=RX; RP=AH. |
| AT8 | AH:=RP14; RX:=AH; RA:=RS; RB:=AH (X/Y). |

6(d)b(i) Slot 1

The iteration count is passed from the processor register RP to the sequence register RS and the extend flag toggle TET is reset in the slot by NAND gate GRS which is opened by the inverted AT1 pulse as toggles TR and TACK are reset at this stage.

6(d)b(ii) Slot 2

The multiplicand is passed from the accumulator RL to the operator register RO and the processor register RP in this slot.

6(d)b(iii) Slot 3

The multiplicand is multiplied by two and passed from the processor register RP to the modifier register RM in this slot. The multiplication by two operation is formed by effectively shifting the contents of register RP up by one place. This shift operation is performed by connecting the bit 1 output of register RP to bit 2 of the highway and so on for each bit. The one bit up slipped wiring is under the control of micro-bit signal AH:=2RP.

6(d)b(iv) Slot 4

The contents of the modified register RM and the operator register RO are added and placed in the processor register RP in this slot. This forms three times the multiplicand in the processor register.

6(d)b(v) Slot 5

The "three times multiplicand" is passed to registers RE and RF (RF holds bits 25 and 26) in this slot and the sign of the multiplier is copied into the sign transfer toggle STT (FIG. 1b) associated with the auxiliary register RX. Toggle STT will be set if the sign of the multiplier is negative and reset if positive.

6(d)b(vi) Slot 6

The iteration count is passed from the sequence register RS to the address register RA, register RO is zeroed and the production of micro-bit signals REPEAT and EXPAND is experienced in this slot.

The generation of micro-bit signal EXPAND, signal $\mu$BEP in FIG. 6a, causes the setting of the expand flag toggle TEP. The set condition of this toggle activates the stretch logic at gate GSH and primes the expand toggle TEXP. The generation of micro-bit signal REPEAT, signal $\mu$BR in FIG. 6a, causes the setting of the repeat toggle TR. The set condition of toggle TR inhibits the reset NAND gate GRS.

6(d)b(vii) Slot 7

The multiplier, held in the auxiliary register RX is transferred to the processor register RP in this slot.

6(d)b(viii) Slot 8

The multiplier is shifted right (or down) two places into the auxiliary register RX and the two least significant bits of the multiplier are passed over AHX and AHY to register RB in this slot.

At the end of this slot the expand toggle TEXP will be set by the set condition of toggle TEP and the AT1S pulse. Pulse AT1S also causes the reset of the extend toggle TEXT as toggle TET was reset in slot 1 of this instruction cycle. The setting of toggle TEXP causes a new micro-address to be formed as AND gates G7EP and G6EP will now be opened. As before leads MA1–5 remain in the state defined by the control register RC and, therefore, a micro-address of 0100111 (leads MA1–7) is formed. The newly formed micro-address is used to retrieve a third set of micro-bits for this instruction and these micro-bits are stored in micro-programme store unit $\mu$PS6 at location 2.

6(d)c third-set of micro-bits for multiply

The following table shows the micro-bits stored at the location defined by micro-address 0100111:

Pulse time:   Function ($\mu$-bits)
AT1 ___ (IF RB=01) AH:=RL; (IF RB=10) AH:=RM; (IF RB=11) AH:=RE and RF; RP:=RO+AH.
AT2 ___ AH:=RP/4; RO:=AH RO(25/26):AH24; RD:=AH(X/Y); BYPASS.
AT7 ___ RS:=RA+1; AH:=RX; RP:=AH.
AT8 ___ AH:RP/4; RX:=AH; AH(23/24):=RD; RB:=AH(X/Y); RA:=RS; (IF RA=O) END.

6(d)c(i) Slot 1

"Nought times," "one times," (accumulator RL) "two times" (register RM) or "three times" (registers RE and RF) the multiplicand is presented to the highway and added to the partial product (register RO) in this slot.

6(d)c(ii) Slot 2

The new partial product, in register RP, is right shifted two places into register RO with sign regeneration on bits 25 and 26 of this register. The two least significant bits of the partial product before shifting are transferred to register RD. The micro-bit signal BYPASS sets toggle TBS in FIG. 4 causing the bypass of slots AT3 to AT6.

6(d)c(iii) Slot 7

The iteration count is reduced by one in this slot and the multiplier is passed from the auxiliary register RX to the processor register RP.

6(d)c(iv) Slot 8

The multiplier is right shifted a further two places in this slot into the auxiliary register RX and the two least significant bits before shifting are passed to register RB. The two least significant bits of the partial product are passed into the most significant bits of register RX. The iteration count is passed from the sequence register RS to the address register RA.

The above set of micro-bits are repeated until the iteration count reaches zero. When this occurs the address register RA generates an "if condition" signal RA=0. This causes the micro-bit signal END to be generated in slot AT8. Micro-bit signal END, shown as $\mu$BED in FIG. 6a, causes the setting of the end flag toggle TED. The set condition of the end flag toggle TED, on its reset output, causes the reset of the repeat toggle TR and, therefore, the removal of the inhibit on the reset gate GRS.

The set condition of toggle TED, on its set output, primes the end toggle TEND which sets when pulse AT1S occurs. The setting of toggle TEND causes the micro-address to be increased by one as toggle TEXP is still set at this stage and AND gate G1ED is opened in addition by the set condition of toggle TEND. The newly formed micro-address, 1100111 (leads MA1–7), is used to retrieve a fourth set of micro-bits for this instruction and these micro-bits are stored in the next location (i.e. location 3) in the micro-programme store unit $\mu$PS6.

6(d)d Fourth-set of micro-bits for multiply

The following table shows the micro-bits stored at the location defined by micro-address 1100111.

Pulse time:   Function ($\mu$-bits)
AT1 _____ AH:=RX; RP:=AH.
AT2 _____ RA:=RS; READ; AH:=2RP; RX:=AH; RD1:=AH25.
AT3 _____ AH:=RO; RP:=AH; +1; RW:=AH.
AT4 _____ AH:=RR; RS:=AH; REWRITE.
AT5 _____ AH:=RL; RO:=$\overline{AH}$.
AT6 _____ RA:=RS; READ; AH:=RW (IF STT) RP:=+AH.
AT7 _____ AH:=2RP; AH1:=RD1; RL:=AH; RS:+RA+1.
AT8 _____ NXTOP.

At this stage the partial product will be in the accumulator operator register RO and the auxiliary register RX the least significant bits of the partial product being in the auxiliary register and the most significant bits in the operator register RO while the multiplicand will be in register RL.

6(d)d(i) Slot 1

The least significant section of the partial product is passed to the processor register RP in this slot and as the setting of toggle TED has reset the repeat toggle TR, NAND gate GRS is opened causing the resetting of the extend and expand flag toggles TET and TEP in FIG. 6a.

6(d)d(ii) Slot 2

The contents of the sequence register RS are passed to the address register RA in this slot for a READ operation. The sequence register RS is used to hold the "complement plus one" of the iteration count, however, the END micro-routine is only entered when RA:=0 (i.e. the iteration count becomes zero) and therefore the store is addressed in this slot at the location defined by the all noughts address. It will be remembered that this address was used in the first micro-routine (sections 6dc(iii) and (iv)) to store the sequence control number. Hence the sequence control number will be placed in the store output register RR. The least significant section of the partial product is also given a one bit left shift in the auxiliary register in this slot and bit 25 so produced is placed in register RD1.

6(d)d(iii) Slot 3

The most significant section of the partial product is passed to the processor register RP and the store input register RW in this slot. It should be noted that the +1 toggle in the processor register is set at this stage but is not used until slot 6.

6(d)d(iv) Slot 4

The sequence control number is written into the sequence register RS from the store output register RR in this slot.

6(d)d(v) Slot 5

The complement multiplicand is passed to the operator register RO in this slot.

6(d)d(vi) Slot 6

The next instruction is prepared in this slot by addressing the store with the sequence control number. Four times the multiplicand is also subtracted from the partial product in this slot if the sign transfer toggle STT is set indicating that the multiplier has a negative number. The complement of the multiplicand is held in the operator register hence one has to be added to this number to perform the subtract operation and this is performed under the control of the +1 toggle which was set in slot 3.

6(d)d(vii) Slot 7

The partial product is left shifted into the accumulator RL in this slot and the most significant bit of the least significant section of the product held temporally after slot 1 in register RD1 is inserted. The corrected product is therefore formed in the accumulator RL and auxiliary register RX.

6(d)d(viii) Slot 8

The next instruction word is read in this slot causing the stepping on of the programme.

Consideration has now been given to the automatic instructions, and one arithmetic instruction together with certain other simple instructions. It will be appreciated that all the usual instructions may be incorporated, such as ADD, SUBTRACT, SHIFT, DIVIDE and so on in the data processing device according to the invention. However, additionally the organization of the data processing device according to the invention allows the execution of certain instructions which are not readily executed by known general purpose devices.

(7) ADDITIONAL INSTRUCTIONS

Consideration has been given to the use of bits 1–16 of the instruction word as a data address and as an iteration count. These bits can be made to have a further use and that is employed in the "registers interchange" instruction.

(7a) Interchange Registers Instruction

This instruction enables (1) the contents of the accumulator register (RL) to be transferred to either the modifier register (RM) or the auxiliary register (RX) or both of these registers or (2) the contents of either the modifier register (RM) or the auxiliary register (RX) to be transferred to the accumulator register (RL) or (3) the resetting of any of the three above mentioned registers or (4) combinations of the above three operations. The full complement of operations will be considered at the end of section 7a (viii).

The following table shows the micro-bits selected by the micro-address used for the interchange registers instruction:

| Pulse time: | Function ($\mu$-bits) |
|---|---|
| AT1 | AH:=RO; RU:=AH. |
| AT2 | (IF RU1=1) AH:RL; (IF RU2=1) RO:=AH. |
| AT3 | (IF RU3=1) AH:=RX; (IF RU4=1) RL:=AH. |
| AT4 | (IF RU5=1) AH:=RO; RX:=AH; (IF RU6=1) AH:=RO; RM:=AH. |
| AT5 | (IF RU7=1) AH:=RM; RL:=AH. |
| AT6 | RA:=RS; READ. |
| AT7 | RS:=RA+1. |
| AT8 | NXTOP. |

7(a)(i) Slot 1

The address section of the instruction word is transferred into the output register RU in this slot. The output register is used, not as such but, as a control register and it is capable, on its seven least significant bits, of conrolling seven "if conditions." The address section of the instruction word contains a supplementary code in bits 1 to 7 which is used to "select" the desired interchange and/or resetting operation. Each bit of the supplementary code is used to control a particular register-to-highway or highway-to-register transfer or both. Bits 1 and 2 of the supplementary code are arranged to be active in slot 2, bits 3 and 4 in slots 3, bits 5 and 6 in slot 4 and bit 7 in slot 5.

7(a)(ii) Slot 2

If bit 1 of the supplementary code is a "1" the contents of the accumulator register RL are passed to the highway and if bit 2 of that code is a "1" the data on the highway is written into the operator register in this slot. Hence if bit 1 is a "0" and bit 2 is a "1", zero is written into the operator register RO and if bits 1 and 2 are both in the "1" state the contents of the accumulator register RL are passed to the operator register RO.

7(a)(iii) Slot 3

If bit 3 of the supplementary code is a "1" the contents of the auxiliary register RX are passed to the highway and if bit 4 is a "1" the data on the highway is written into the accumulator register RL in this slot. Hence if bit 3 is a "0" and bit 4 is a "1", zero is written into the accumulator register RO and if bits 3 and 4 are both in the "1" state the contents of the auxiliary register RX are passed to the accumulator register RL.

7(a)(iv) Slot 4

If bit 5 of the supplementary code is a "1", contents of the operator register RO are transferred, via the highway to the auxiliary register RX and if bit 6 is a "1" the contents of the operator register RO are transferred, via the highway to the modifier register RM in this slot. Hence if bits 5 and 6 are both in the "1" state the contents of register RO are transferred, via the highway, to both register RX and RM. This operation can be used to reset both register RX and RM if register RO was reset under the control of the "1" of bit 2 in slot 2. Additionally if bits 1 and 2 are in the "1" state selection of either or both of bits 5 and 6 causes the contents of the accumulator register RL to be transferred into either or both of these registers via the temporary storage afforded by register RO.

7(a)(v) Slot 5

If bit 7 of the supplementary code is a "1" the contents of the modifier register are transferred to the accumulator register RL in this slot.

7(a)(vi) Slot 6

The next instruction word in the current programme is read in this slot.

7(a)(vii) Slot 7

The next but one instruction address is prepared in this slot.

7(a)(viii) Slot 8

The next instruction is selected in this slot. The following table shows the operation defined by the various usable supplementary codes.

| Bits selected: | Operation |
|---|---|
| 4 | Reset RL. |
| 2,5 | Reset RX. |
| 2,6 | Reset RM. |
| 2,4,5 | Reset RL and RX. |
| 2,4,6 | Reset RL and RM. |
| 2,5,6 | Reset RX and RM. |
| 3,4 | Write RX into RL. |
| 7 | Write RM into RL. |
| 1,2,5 | Write RL into RX. |
| 1,2,6 | Write RL into RM. |
| 1,2,5,6 | Write RL into RX and RM. |
| 1,2,3,4,5 | Inter-change RL and RX. |
| 1,2,3,4,6 | Write RL into RM and RX into RL. |
| 1,2,5,7 | Write RL into RX and RM into RL. |
| 1,2,4,5 | Write RL into RX and reset RL. |
| 1,2,4,6 | Write RL into RM and reset RL. |
| 2,3,4,5 | Write RX into RL and reset RX. |
| 2,5,7 | Write RM into RL and reset RX. |

7(b) "Increment modifier and if not zero go-to-label" instruction

This instruction may be used at the end of a repetitive programme loop which is called upon to operate separately upon a distinct number of sets of data words. The modifier acts as an iteration count indicating the required number of "passes" the programme loop is to perform. The following table shows the micro-bits read from the micro-programme store when addressed with the micro-address corresponding to the code for this instruction:

| Pulse time: | Function (u-bits) |
|---|---|
| AT1 | RP:=RO+AH. |
| AT2 | AH:=RP; RE:=H. |
| AT3 | AH:=RM; RO:=AH; RA:=RS. |
| AT4 | RP:=RO+AH; +1. |
| AT5 | AH:=RP; RM:=AH. |
| AT6 | (IF RM=O) AH:=RE; RA:=AH; READ. |
| AT7 | RS:=RA+1. |
| AT8 | NXTOP. |

Basically the instruction uses the modifier register RM as a guard-count register which causes a programme jump to be performed to an address specified by the "Increment modifier and if not zero go to label" instruction when the modifier register is not zero.

7(b)(i) Slot 1

The label address, (i.e. the address of the programme instruction word to which the programme must jump if the count is not zero) is passed unmodified, as bit 23 will not be marked in this instruction word, to the processor register RP in this slot.

7(b)(ii) Slot 2

The label address is passed from the processor register to the extra register RE in this slot.

7(b)(iii) Slot 3

The modifier word is passed from the modifier register RM to the operator register RO in this slot and the sequence number is written into the address register RA.

7(b)(iv) Slot 4

One is added to the contents of the operator register RP while it is passed to the operator register RO in this slot.

7(b)(v) Slot 5

The incremented modifier, is returned to the modifier register in this slot. If the modifier is not yet reduced to zero the "if condition" signal IFC RM=0 (FIG. 1) will be generated by the modifier register RM.

7(b)(vi) Slot 6

If the modifier has not been incremented to zero, the label address is passed to over-write the next address formed in slot 3 in the register RA and a READ operation is performed. This causes the jump address to be selected and read as the next instruction, thus, causing the programme to return to the iterative loop. If the modifier has been reduced to zero the next address formed in slot 3 prevails, and the programme will exit from the iterative loop.

7(b)(vii) Slot 7

The next programme address is formed in this slot. If the jump has been satisfied, this address will be used after the instruction defined by the label address. However, if the jump has not been satisfied (i.e. RM=0), this address will not be used.

7(b)(viii) Slot 8

The next instruction is read out of the store output register RR in this slot and it will be that instruction specified by the label address if the jump has been satisfied to return to the programme loop or it will be the next instruction in the programme.

7(c) "Skip if (RL and RX=STORE AND RX)" instruction

This instruction permits working data (or part of it) in the accumulator to be compared directly with stored data. The instruction uses a "mask," held in complement form in the auxiliary register. If the specified part of the accumulator data equals the equivalent part of the store data, the next instruction of the programme is bypassed. The address section of the instruction word specifies the location of the store data and the mask is stored in the auxiliary register prior to entry into this instruction. The micro-address for this instruction will be considered as 0111000 for leads MA1–7 in FIG. 6 and the following table shows the micro-bits stored at that location (i.e. location 14 in micro-programme store section $\mu$PS1).

| Pulse time: | Function (micro-bits) |
|---|---|
| AT1 | (IF MODIFY) AH:=RM; RP:=RO+AH. |
| AT2 | AH:=RP; RA:=AH; READ. |
| AT3 | Idle. |
| AT4 | AH:=RR; RO:=$\overline{AH}$ REWRITE. |
| AT5 | AH:=RO; RP:=AH. |
| AT6 | AH:=RL; RO:=$\overline{AH}$. |
| AT7 | AH:=RO; RL:=AH; EXPAND. |
| AT8 | AH:=RL; RO:=$\overline{AH}$; AH:=RX. |

7(c)(i) Slot 1

The instruction specified address (i.e. the address of the data to be compared with the accumulator) is modified and end passed to the processor register RP in this slot.

7(c)(ii) Slot 2

The modified address is passed from the processor register RP to the store address register RA and the store is addressed for a read operation in this slot.

7(c)(iii) Slot 3

Idle.

7(c)(iv) Slot 4

In this slot the complement of the data read from the store is passed from the store output register RR to the operator register and the store is activated for a rewrite operation.

7(c)(v) Slot 5

The complement of the store data is fed from the operator register to the processor register in this slot.

7(c)(vi) Slot 6

The complement of the working data in accumulator register RL (the data to be compared with the store data) is passed to the operator register in this slot.

7(c)(vii) Slot 7

The contents of the operator register RO are rewritten into register RL in this slot. This operation inverts the working data. Expand is also signalled in this slot causing the setting of the expand flag toggle TED in FIG. 6 as shown above in section 6(d)b(vi).

7(c)(viii) Slot 8

The contents of the accumulator (complement of working data) and the auxiliary register RX (complement of required mask) are fed to the highway and the complement of the resultant data on the highway is fed into the operator register in this slot. This operation causes the required part of the working data to be placed in the operator register as the register to highway connections are commoned. The following table shows the relevant operations performed in the first instruction cycle to place the required part of the working data in the operator register using a twelve bit number as an example.

| Start RX | 111100001100 |
|---|---|
| Start RL | 010111011101 |
| Slot 7 RL | 101000100010 |
| Slot 8 AH | 111100101110 |
| Slot 8 RO | 0000 1101 00 01 |

The sections formed by the divisions in the operator register correspond to the sections defined by the mask.

The expand toggle TEXP is set at the end of this slot and the micro-address becomes 0111011 for leads MA1–7. Hence a second set of micro-bits are selected to control the second cycle of this instruction.

7(c)a Second instruction, cycle of "Skip if" instruction

The expanded micro-address defines location 14 in micro-programme store section μPS5 and the following table shows the micro-bits selected.

| Pulse time: | Function (μ-bits) |
|---|---|
| AT1 | AH:=RP; AH:=RX; RL:=AH; +1. |
| AT2 | AH:=RX; RP:=RO+AH; RA:=RS. |
| AT3 | |
| AT4 | AH:=RP; RL:=AH; RS:=RA+1. |
| AT5 | |
| AT6 | (IF RL=O) RA=RS READ. |
| AT7 | AH:=RO; RL:=AH RS:=RA+1. |
| AT8 | NXTOP. |

At the start of this instruction cycle, the complement of the stored data is held in the processor register RP and the operator register holds the required section or sections of the working data. The complement of the required "mask" is still held in the auxiliary register.

7(c)a(i) Slot 1

The complement of the stored-data (register RP) and the complement of the required "mask" (register RX) are applied to the highway and the "ored" resultant is passed into the accumulator register RL. This operation places the complement of the required section of the stored data in the accumulator register RL. The "plus one" toggle is set in the processor register RP at this stage.

7(c)a(ii) Slot 2

The required sections of the complement of the stored data is passed to the highway in this slot and an addition process (involving the highway data, the required sections of the working data (register RO) and one), takes place. The result of this process is placed in register RP. This operation causes the selected store data sections to be subtracted from the selected working data sections. The next instruction address is also placed in register RA in this slot.

7(c)a(iii) Slot 3

Idle.

7(c)a(iv) Slot 4

The result of the subtraction process performed in slot 2 is passed to the accumulator register RL in this slot and the sequence control number is incremented by one forming the "next but one" instruction address in the sequence register RS.

7(c)a(v) Slot 5

Idle.

7(c)a(vi) Slot 6

If the result of the subtraction process performed in slot 2 is zero, indicating that the selected section or sections of the working data was equal to the equivalent section or sections of the stored data, the if condition IFC RL=0 will be active in FIG. 1. This condition controls the transfer of the "next but one" instruction address, formed in slot 4, into the address register RA. If the result of the subtraction process was not zero the address register is not modified and it contains the next instruction address. A store read operation is performed in this slot using either the next or the next but one instruction address.

7(c)a(vii) Slot 7

The "masked" working-data is returned to the accumulator in this slot and the sequence control number is incremented by one into the sequence register RS.

7(c)a(viii) Slot 8

The programme steps on to the next or next-but-one instruction in accordance with the result obtained in this instruction.

7(d) Go to relative label instruction

This instruction enables a specific number of instructions to be bypassed by adding a constant to the sequence control number. The constant is specified in the address section of the instruction word. The following table shows the micro-bits generated by the micro-programme store when addressed with the micro-address code corresponding to this instruction.

| Pulse time: | Micro bits |
|---|---|
| AT1 | (IF MODIFY) AH:=RM; |
| AT2 | RP.=RO+AH. |
| AT3 | AH:=RP; RE:=AH. |
| AT4 | AH:=RS; RO:=AH. |
| AT5 | AH:=RE; RP:=RO+AH. |
| AT6 | AH:=RP; RA:=AH; READ. |
| AT7 | RS:=RA+1. |
| AT8 | NXTOP. |

From the above table it can be seen that the address section of the instruction word after modification is added to the current sequence control number and this newly formed sequence control number controls the next step of the programme.

(8) MICRO-PROGRAMME STORE ORGANIZATION

The following tables show a typical allocation of instructions to micro-addresses and shows how extend, expand end and automatic instructions are accommodated.

(8.1) Micro-programme store section μPS1

| Micro-addresses MA1–MA7: | Instruction title |
|---|---|
| 0000000 | Start-up. |
| 1000000 | Input outgoing interrupts. |
| 0100000 | Input outgoing Interrupts. |
| 1100000 | Go to label. |
| 0010000 | Input data block/cancel store block. |
| 1010000 | Stop, go to label. |
| 0110000 | Output data block. |
| 1110000 | Execute label. |
| 0001000 | Input single word. |
| 1001000 | Output single word. |
| 0101000 | Standardise floating point number. |
| 1101000 | Interchange registers. |
| 0011000 | Compare store and accumulator. |
| 1011000 | Difference exponents. |
| 0111000 | Skip if (RL AND RX)=(Store AND RX). |
| 1111000 | AND merge store into accumulator. |

(8.2) Micro-programme store section μPS2

| Micro-addresses MA1–MA7: | Instruction title |
|---|---|
| 0000100 | Transfer label to interrupt register. |
| 1000100 | Transfer label to register RH. |
| 0100100 | Multiply. |
| 1100100 | Transfer label to register RJ. |
| 0010100 | Right shift. |
| 1010100 | Transfer label to Register RM. |
| 0110100 | Divide. |
| 1110100 | Run until keyboard address. |
| 0001100 | Left shift. |
| 1001100 | Round off accumulator. |
| 0101100 | Spare. |
| 1101100 | Add store to accumulator. |
| 0011100 | Increment store into accumulator. |
| 1011100 | Decrement store into accumulator. |
| 0111100 | Increment store into modifier register. |
| 1111100 | Decrement store into modifier register. |

(8.3) Micro-programme store section μPS3

| Micro-addresses MA1–MA7: | Instruction title |
|---|---|
| 0000010 | Go to relative label. |
| 1000010 | If accumulator positive go to label. |
| 0100010 | If accumulator negative go to label. |
| 1100010 | If accumulator zero go to label. |
| 0010010 | Extend input data block (second instruction cycle). |
| 0110010 | Extend output data block (second instruction cycle). |
| 1110010 | If accumulator odd go to label. |
| 0001010 | If overflow go to label. |
| 1001010 | If accumulator greater than operand go to label. |
| 0101010 | Spare. |
| 1101010 | Go to named sub-routine. |
| 0011010 | Increment modified and if not zero go to label. |
| 1011010 | Cancel store word. |
| 0111010 | Transfer accumulator to guard register. |
| 1111010 | Transfer RI to accumulator. |

(8.4) Micro-programme store section μPS4

| Micro-addresses MA1–MA7: | Instruction title |
|---|---|
| 0000110 | Transfer store to accumulator. |
| 1000110 | Transfer store to auxiliary reg. |
| 0100110 | Extend multiply (second instruction cycle). |
| 1100110 | Transfer accumulator to store. |
| 0010110 | Transfer auxiliary reg. to store. |
| 1010110 | Transfer modifier reg. to store. |
| 0110110 | Extend divide (second instruction cycle). |
| 1110110 | Transfer extra reg. to store. |
| 0001110 | Add store to accumulator. |
| 1001110 | Add store to accumulator (add in carry). |
| 0101110 | Spare. |
| 1101110 | Subtract store from accumulator. |
| 0011110 | Subtract store from accumulator (add in carry). |
| 1011110 | OR merge store into accumulator. |
| 0111110 | AND merge accumulator into store. |
| 1111110 | OR merge accumulator into store. |

All the non-automatic instructions have now been accommodated, the remaining micro-programme store sections μPS5 and μPS6 accommodate automatic instructions and expand and end cycle micro-bits for instructions accommodated in micro-programme store sections μPS1 to 4.

(8.5) Micro-programme store section μPS5

| Micro-addresses MA1–MA7: | Instruction title |
|---|---|
| 0000011 | Indirect address. |
| 1000011 | ADT interrupt (incoming). |
| 0100011 | ADT interrupt (outgoing). |
| 1100011 | Spare. |
| 0010011 | Expand input data block (third instruction cycle). |
| 1010011 | End input data block (final instruction cycle). |
| 0110011 | Expand output data block (third instruction cycle). |
| 1110011 | End output data block (final instruction cycle). |
| 0001011 | Expand input single word (second instruction cycle). |
| 1001011 | Expand output single word (second instruction cycle). |
| 0101011 | Expand standardise floating point number (second instruction cycle). |
| 1101011 | End standardise floating point number (final instruction). |

0011011 ____ Expand compare store and accumulator (second instruction cycle).
1011011 ____ Expand difference exponents (second instruction cycle).
0111011 ____ Expand skip if (second instruction cycle).
1111011 ____ Expand AND merge store into acc. (second instruction cycle).

These instructions when expanded, enter an iterative instruction cycle and do so with a "repeat" condition. These instructions have their first instruction cycle microbits in micro-programme store section μPS1, may be extended by the corresponding location in micro-programme store section μPS3 and are ended in this section at the "corresponding location plus one."

Those instructions which have not been extended but are expanded have their first instruction cycle microbits in micro-programme store section μPS1.

(8.6) Micro-programme store section μPS6

Micro-addresses
MA1–MA7                    Instruction title
0000111 ____ Priority interrupt.
1000111 ____ Execute keyboard/computer instruction.
0100111 ____ Expand multiply (third instruction cycle).
1100111 ____ End multiply (final instruction cycle).
0010111 ____ Expand right shift (second instruction cycle).
1010111 ____ End right shift (final instruction cycle).
0110111 ____ Expand divide (third instruction cycle).
1110111 ____ End divide (final instruction cycle).
0001111 ____ Expand left shift (second instruction cycle).
1001111 ____ End left shift (final instruction cycle).
0101111 ____ Spare.
1101111 ____ Expand add store to accumulator (second instruction cycle).
0011111 ____ Expand increment store into accumulator (second instruction cycle).
1011111 ____ Expand decrement store into accumulator (second instruction cycle).
0111111 ____ Expand increment store into modifier reg. (second instruction cycle).
1111111 ____ Expand decrement store into modifier reg. (second instruction cycle).

All the expanded instructions in this section of the store have their first instruction cycle micro-bits in micro-programme store μPS2.

(9) SYSTEM ORGANIZATION

From the above description it will be seen that the data processing device according to the invention is a highway orientated micro-programme controlled stored programme device in which the instructions are coded to define micro-addresses and the micro-programme store is divided into three sections, (1) storing control information for one cycle instructions and the first cycle control information for all multi-instruction cycle instructions requiring three or more instruction cycles, (2) storing control information for further one cycle instructions and control information for the second cycle of all the iterative instructions requiring three or more cycle operations and (3) storing control information for automatic instructions, control information for the iterative instruction cycles together with the final cycle information for all multi-cycle instructions.

The highway to register connections are ORed together allowing OR merging to be performed by simply connecting two or more registers to the highway at the same time.

The instruction cycle is performed in eight slots synchronised with the operation of the store. Each instruction cycle may include two passes at the store, one for the retrieval or writing of working data and the other for the retrieval of the programme instruction data.

All operations in the system are under the control of the micro-bits and these bits are extended as micro-bit signals under the control of the eight slot cycle timing arrangements.

Additionally it has been shown how specific programme instructions may be executed.

The above description has been of one embodiment only and is intended to be in no way limiting to the scope of the invention.

We claim:

1. A micro-program controlled data processing device comprising a control unit, a main store, means for reading out of and writing into said main store in a first cycle, a plurality of functional units for performing logical and arithmetic operations in a second cycle, a micro-program store included in said control unit, means in said micro-program store responsive to a function code portion of an instruction word read from said main store for selecting a location in said micro-program store at which is located a set of micro-instructions which are effective to condition said functional units to perform the required instruction in said second cycle, said instruction word also including an address section for indicating a main store location at which is stored data for use in the instruction, a first timing device for timing said first cycle, a second timing device for timing said second cycle, said first cycle having half the duration of said second cycle whereby two passes are made to said main store during each second cycle, one pass being for the retrieval of working data required in the performance of the intructions and the other for the retrieval of the next instruction word in the program and means responsive to a particular micro-instruction for shortening said first and said second cycle times when retrieval of working data from said main store is not required.

2. A micro-program controlled data processing device as claimed in claim 1 in which an instruction cycle is divided into eight slots by the provision of a slot defining circuit having eight sequentially connected positions and said last mentioned means are effective in stepping said slot defining circuit from the second to the seventh position.

3. In a stored program data processing system arranged to execute an instruction by a sequence of at least an initial machine step, said instruction being defined by an instruction word including at least one data address and an instruction code and each of said machine steps being defined by a machine control word, a store for storing machine control words, each of which includes a plurality of tags, register means for holding said instruction code and for defining n–1 bits of the address of the control word for said initial step, the $n^{th}$ and most significant bit always being in the nought state for an initial step, logic means for addressing said store as determined by said register means, means for marking said tags on a mutually exclusive basis, means in said logic means effective when any one of said tags is marked for modifying the address of a previous step to form the address of the next step of the sequence, said store having first, second and third sections therein, means in said logic means responsive to the marking of a first tag for changing said $n^{th}$ bit to the one state to select a control word having a corresponding address in the third section of said store, means in said logic means responsive to the marking of a second tag for changing the most significant bit of said n–1 bits to the one state to select a control word having a corresponding address in the second section of said store, means in said logic means responsive to the marking of a third tag for reapplying the same address to select the same control word in said store, and means in said control logic responsive to the marking of a fourth tag for changing the least significant of said $n-1$ bits to the one state to select the next control word in the same section of said store.

References Cited

UNITED STATES PATENTS

| 3,245,044 | 4/1966 | Meade et al. | 340—172.5 |
| 3,268,872 | 8/1966 | Kimlinger | 340—172.5 |
| 3,300,764 | 1/1967 | Doelz et al. | 340—172.5 |
| 3,302,183 | 1/1967 | Bennett et al. | 340—172.5 |
| 3,309,679 | 3/1967 | Weisbecker | 340—172.5 |
| 3,315,235 | 4/1967 | Carnevale et al. | 340—172.5 |

PAUL J. HENON, Primary Examiner

S. CHIRLIN, Assistant Examiner